(12) United States Patent
Mizutani et al.

(10) Patent No.: US 10,597,548 B2
(45) Date of Patent: Mar. 24, 2020

(54) RECORDING METHOD

(71) Applicant: Seiko Epson Corporation, Tokyo (JP)

(72) Inventors: Akira Mizutani, Matsumoto (JP); Ippei Okuda, Shiojiri (JP)

(73) Assignee: Seiko Epson Corporation (JP)

( * ) Notice: Subject to any disclaimer, the term of this patent is extended or adjusted under 35 U.S.C. 154(b) by 0 days.

(21) Appl. No.: 16/143,683

(22) Filed: Sep. 27, 2018

(65) Prior Publication Data

US 2019/0100672 A1   Apr. 4, 2019

(30) Foreign Application Priority Data

Sep. 29, 2017 (JP) ................. 2017-190321

(51) Int. Cl.
*B41M 5/00* (2006.01)
*B41J 2/045* (2006.01)
(Continued)

(52) U.S. Cl.
CPC .......... *C09D 11/54* (2013.01); *B41J 2/04563* (2013.01); *B41M 5/0017* (2013.01);
(Continued)

(58) Field of Classification Search
CPC ... B41J 2/01; B41J 2/211; B41J 2/1433; B41J 2/17; B41J 2/17593; B41J 2/2107; B41J 2/1755; B41J 2/2114; B41J 2/2117; B41J 2/2056; B41J 2/21; B41J 2/0057; B41J 3/60; B41J 2002/012; B41J 2/04598; B41J 2/04588; B41J 2/04595; B41J 2/04586; B41J 2/14274; B41J 11/0015; B41J 11/002; B41J 2/161; B41J 2/1623; B41J 2202/00; B41J 2202/03; B41J 2/14201; B41J 2/045; C09D 11/36; C09D 11/40; C09D 11/30; C09D 11/38; C09D 11/32; C09D 11/322; C09D 11/324; C09D 11/328; C09D 11/101; C09D 11/102; C09D 11/005; C09D 11/54; C09D 11/52; B41M 5/0011; B41M 5/0017; B41M 5/0047; B41M 7/00; B41M 7/0072; B41M 5/52; B41M 5/5218
See application file for complete search history.

(56) References Cited

U.S. PATENT DOCUMENTS 6,454,844 B1 * 9/2002 Kanaya .................. C09D 11/40
106/31.47
8,052,268 B2 * 11/2011 Kabalnov ............... C09D 11/40
347/100
(Continued)

FOREIGN PATENT DOCUMENTS

JP   2015-205941 A   11/2015
JP   2015-227003 A   12/2015
(Continued)

OTHER PUBLICATIONS

Extended European Search Report for Patent Application No. EP 18197526.9 dated Jan. 29, 2019 (7 pages).

*Primary Examiner* — Manish S Shah
(74) *Attorney, Agent, or Firm* — Harness, Dickey & Pierce, P.L.C.

(57) ABSTRACT

A recording method according to the invention includes adhering a reaction liquid which reacts with and aggregates components of an ink composition to a recording medium; adhering a first ink composition to the recording medium; and adhering a second ink composition having reactivity with the reaction liquid lower than that of the first ink composition to the recording medium. Adhesion of the second ink composition to the recording medium is performed prior to adhesion of the first ink composition to the recording medium.

17 Claims, 4 Drawing Sheets

(51) Int. Cl.
  *C09D 11/54* (2014.01)
  *D06P 1/52* (2006.01)
  *D06P 5/30* (2006.01)
  *C09D 11/033* (2014.01)
  *C09D 11/107* (2014.01)
  *C09D 11/322* (2014.01)

(52) U.S. Cl.
  CPC .......... *C09D 11/033* (2013.01); *C09D 11/107* (2013.01); *C09D 11/322* (2013.01); *D06P 1/525* (2013.01); *D06P 5/30* (2013.01)

(56) References Cited

U.S. PATENT DOCUMENTS

| | | | | |
|---|---|---|---|---|
| 2004/0035320 | A1* | 2/2004 | Sano | C09D 11/322 347/100 |
| 2004/0127601 | A1* | 7/2004 | Sano | C09D 11/326 523/160 |
| 2012/0050386 | A1* | 3/2012 | Shimizu | C09D 11/322 347/20 |
| 2012/0229861 | A1* | 9/2012 | Okuda | B41J 2/2107 358/2.1 |
| 2016/0194824 | A1 | 7/2016 | Ohashi et al. | |
| 2016/0222244 | A1 | 8/2016 | Kagata et al. | |
| 2016/0251528 | A1 | 9/2016 | Mizutani et al. | |
| 2016/0289479 | A1 | 10/2016 | Okuda | |
| 2017/0166767 | A1 | 6/2017 | Watanabe et al. | |
| 2017/0232763 | A1 | 8/2017 | Okuda | |
| 2017/0283639 | A1 | 10/2017 | Seguchi et al. | |
| 2017/0368819 | A1 | 12/2017 | Kagata et al. | |

FOREIGN PATENT DOCUMENTS

| | | |
|---|---|---|
| JP | 2016-138224 A | 8/2016 |
| JP | 2017-110182 A | 6/2017 |
| JP | 2017-186442 A | 10/2017 |
| JP | 2018-001467 A | 1/2018 |
| JP | 6281396 B2 | 2/2018 |

* cited by examiner

RECORDING METHOD

BACKGROUND

1. Technical Field

The present invention relates to a recording method.

2. Related Art

An ink jet recording method for ejecting minute ink droplets from a nozzle of an ink jet head of an ink jet recording apparatus to record an image on a recording medium is known, and for example, use in a commercial printing field is also being studied. As ink, use of aqueous ink composition (hereinafter also referred to as "aqueous ink" or "ink") is being studied from the viewpoint of global environmental aspects and human safety.

When an image is recorded on a low ink-absorbing recording medium (for example, art paper or coated paper) or an ink non-absorbing recording medium (for example, plastic film) using the aqueous ink composition, by fixing the ink in the early phase using a reaction liquid that reacts with and agglomerates the ink component, thereby improving the image quality without increasing the primary heating temperature (see, for example, JP-A-2015-227003).

However, in a case of recording using a plurality of inks having different reactivity with a reaction liquid, the components of the ink cannot sufficiently react with the reaction liquid due to a difference in reactivity, and image quality and scratch resistance of the recorded material may be deteriorated.

SUMMARY

An advantage of some aspects of the invention is to provide a recording method capable of obtaining a recorded material excellent in image quality and scratch resistance in a recording method using a reaction liquid.

The invention can be realized in the following aspects or application examples.

Application Example 1

According to an aspect of the invention, a recording method includes adhering a reaction liquid which reacts with and aggregates components of an ink composition to a recording medium; adhering a first ink composition to the recording medium; and adhering a second ink composition having a reactivity with the reaction liquid lower than that of the first ink composition to the recording medium. Adhesion of the second ink composition to the recording medium is performed prior to adhesion of the first ink composition to the recording medium.

In this application example, by adhering the second ink composition having low reactivity with the reaction liquid to the recording medium in advance, inks of the first ink composition and the second ink composition are mixed with the reaction liquid, thereby sufficiently reacting. Consequently, it is possible to provide a recording method capable of obtaining a recorded material excellent in image quality and scratch resistance.

Application Example 2

The first ink composition and the second ink composition may be inks of the same color type, and the content of the colorant of the first ink composition may be higher than that of the second ink composition.

In this application example, a recorded material having excellent image quality and scratch resistance can be obtained even in a recording method using deep and light color inks containing different amounts of colorants.

Application Example 3

The adhering of the second ink composition to the recording medium may be performed the first in the adhering of the ink composition used for recording.

In this application example, the adhering of the second ink composition to the recording medium is performed the first in the adhering of the ink composition used for recording, and thus the second ink composition can react sufficiently with the reaction liquid, thereby obtaining a recorded material that is more excellent in image quality and scratch resistance.

Application Example 4

The adhering of the first ink composition to the recording medium and the adhering of the second ink composition to the recording medium may be performed by single scanning to the recording medium using an ink jet head having a length equal to or greater than a recording width in a width direction of the recording medium.

In this application example, in a recording method using an ink jet head having a length equal to or greater than the recording width in the width direction of the recording medium, a recorded material excellent in image quality and scratch resistance can be obtained.

Application Example 5

The adhering of the first ink composition to the recording medium and the adhering of the second ink composition to the recording medium may be performed by scanning a relative position between the recording medium and the ink jet head several times while ejecting the ink composition from the ink jet head, and by sub-scanning in which the relative position between the recording medium and the ink jet head is changed in a sub-scanning direction intersecting a scanning direction.

In this application example, in a recording method using a serial type ink jet head, a recorded material excellent in image quality and scratch resistance can be obtained.

Application Example 6

The content of an organic solvent that is alkylene polyols having a normal boiling point of 280° C. or higher with respect to the total mass of the ink composition may be 1 mass % or less in each of the first ink composition and the second ink composition.

In this application example, the content of the organic solvent that is alkylene polyols having a normal boiling point of 280° C. or higher with respect to the total mass of the ink composition is 1 mass % or less in each of the first ink composition and the second ink composition, and thus a recorded material having better image quality and scratch resistance can be obtained.

Application Example 7

A surface temperature of the recording medium upon adhering the second ink composition to the recording medium and a surface temperature of the recording medium upon adhering the first ink composition to the recording medium may be each 45° C. or less.

In this application example, the surface temperature of the recording medium upon adhering the second ink composition to the recording medium and the surface temperature of the recording medium upon adhering the first ink composition to the recording medium are each 45° C. or less, and the ejection stability of the ink is improved.

Application Example 8

A coagulant contained in the reaction liquid includes at least one of a polyvalent metal salt, a cationic polymer, and organic acid.

In this application example, by including at least one of a polyvalent metal salt, a cationic polymer, and organic acid as the coagulant contained in the reaction liquid, a recorded material excellent in image quality and scratch resistance can be obtained without increasing the surface temperature of the recording medium upon recording, so that the ejection stability of the ink is improved.

Application Example 9

The first ink composition and the second ink composition may each include resin microparticles, and the content of the resin microparticles of the second ink composition may be greater than that of the first ink composition.

In this application example, the first ink composition and the second ink composition each include resin microparticles, and the content of the resin microparticles of the second ink composition is greater than that of the first ink composition, thereby obtaining a recorded material having better image quality and scratch resistance. The ejection stability of the ink is also improved during recording.

Application Example 10

A viscosity when the resin microparticles contained in the first ink composition and the resin microparticles contained in the second ink composition are respectively mixed with a 0.3 M aqueous solution of magnesium sulfate may increase less than 5 times.

In this application example, the viscosity when the resin microparticles contained in the first ink composition and the resin microparticles contained in the second ink composition are respectively mixed with the 0.3 M aqueous solution of magnesium sulfate increases less than 5 times, thereby reducing reactivity between the resin microparticles in the ink and the reaction liquid. Therefore, by adhering the second ink composition having low reactivity with the reaction liquid to the recording medium in advance, inks of the first ink composition and the second ink composition are mixed with the reaction liquid, thereby sufficiently reacting. Consequently, it is possible to provide a recording method capable of obtaining a recorded material excellent in image quality and scratch resistance. Furthermore, when the reaction liquid and the ink react with each other to form an image, it is possible to form a smooth film, thereby further improving the image quality. Since the colorant is deposited by coating with the resin microparticles after precipitating (reacting) in advance, scratch resistance is further improved.

Application Example 11

A recording region in which a ratio of the amount of the reaction liquid adhered to the total deposited amount of the ink composition containing the first ink composition and the second ink composition per unit area is 5 mass % or more and 20 mass % or less may be recorded.

In this application example, the recording region in which a ratio of the amount of the reaction liquid adhered to the total deposited amount of the ink composition containing the first ink composition and the second ink composition is 5 mass % or more and 20 mass % or less is recorded, and thus a recorded material excellent in image quality and scratch resistance can be obtained.

Application Example 12

The content of the resin microparticles contained in the second ink composition may be 4 mass % or more.

In this application example, the content of the resin microparticles contained in the second ink composition is 4 mass % or more, and thus a recorded material excellent in image quality and scratch resistance can be obtained.

BRIEF DESCRIPTION OF THE DRAWINGS

The invention will be described with reference to the accompanying drawings, wherein like numbers reference like elements.

DESCRIPTION OF EXEMPLARY EMBODIMENTS

Figure 1:
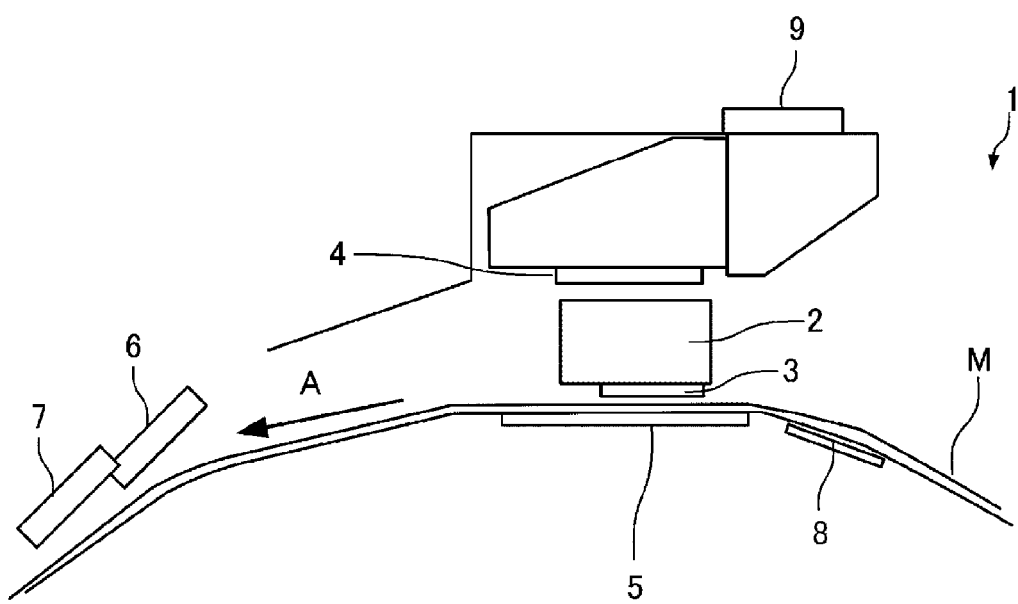
FIG. 1 is a schematic sectional view schematically showing an ink jet recording apparatus.

Hereinafter, embodiments of the invention will be described in detail. The embodiments described below respectively explain one example of the invention. However, the invention is not limited to the following embodiments, and various modifications and improvements are available as long as they do not impart the scope of claims.

In an aspect of a recording method according to the present embodiment, the recording method includes adhering a reaction liquid which reacts with and aggregates components of an ink composition to a recording medium; adhering a first ink composition to the recording medium; and adhering a second ink composition having a reactivity with the reaction liquid lower than that of the first ink composition to the recording medium, in which adhesion of the second ink composition to the recording medium is performed prior to adhesion of the first ink composition to the recording medium.

Hereinafter, an exemplified recording method according to the present embodiment will be described in the order of a recording apparatus for performing the recording method, an ink composition (hereinafter also referred to as "ink"), a reaction liquid, a recording medium, and the recording method.

In the specification, "Duty" is a value calculated by the following formula (1).

$$\text{Duty}(\%) = \{\text{actual printed dot number}/(\text{longitudinal resolution} \times \text{lateral resolution})\} \times 100 \quad (1)$$

In the formula, "actual printed dot number" is the actual number of printed dots per unit area, and "longitudinal resolution" and "lateral resolution" are respectively the resolution per unit area.

1. Configuration 1.1. Recording Apparatus

An exemplified recording apparatus in which the recording method according to the present embodiment is performed will be described with reference to an ink jet recording apparatus. However, the exemplified recording apparatus that can be used for the recording method according to the present embodiment is not limited to the ink jet recording apparatus.

Hereinafter, the ink jet recording apparatus used in the present embodiment will be described with a consideration of an on-carriage type printer in which a cartridge is mounted on a carriage as an example. However, the ink jet recording apparatus is not particularly limited to the on-carriage type printer, but may be an off-carriage type printer in which the cartridge is fixed to the outside without being mounted on the carriage.

A printer used in the following description has an ink jet head mounted on a carriage that moves in a predetermined direction, which is an ink jet recording apparatus with a serial type ink jet head by which liquid droplets are ejected onto a recording medium as the head moves along with a movement of the carriage. However, the recording apparatus is not limited to such a printer in the present embodiment, but may be an ink jet recording apparatus in which a head is formed to be wider than the width of the recording medium, and which is provided with an ink jet head having a length equal to or greater than a recording width in a width direction and ejecting liquid droplets onto the recording medium without moving a print head.

In particular, the ink jet recording apparatus provided with the serial type ink jet head is a device for recording which performs scanning (pass) for ejecting an ink composition while relatively moving the ink jet head for recording relative to the recording medium several times. A specific example of the serial type ink jet head includes a unit, in which one or more ink jet heads are mounted on a carriage that moves in the width direction (a direction intersecting a transport direction of the recording medium) of the recording medium, while the liquid droplets are ejected onto the recording medium by the ink jet head which moves as the carriage moves. Such recording is also called a serial type recording method or a multi-pass recording method.

Meanwhile, an ink jet recording apparatus provided with a line type ink jet head is a device for recording which performs scanning (pass) once by ejecting an ink composition while relatively moving the recording ink jet head with respect to the recording medium. A specific example of the line type ink jet head includes a unit in which a length of the ink jet head in the width direction (a direction intersecting the scanning direction) of the recording medium is a length equal to or longer than the recording width in the width direction of the recording medium, while the head for recording does not move and ejects droplets onto the recording medium. Such recording is also called a line type recording method or a one-pass recording method.

In the drawings cited in the following description, the scale of each member is appropriately changed in order to exhibit each member in a recognizable size.

FIG. 1 is a schematic sectional view schematically showing an ink jet recording apparatus. As shown in FIG. 1, an ink jet recording apparatus is provided with a carriage 2, an ink jet head 3, an IR heater 4, a platen heater 5, a curing heater 6, a cooling fan 7, a preheater 8, and a ventilation fan 9. The ink jet recording apparatus 1 includes a controller (not shown), and the operation of the entire ink jet recording apparatus 1 is controlled by the controller.

The carriage 2 mounts the ink jet head 3, and detachably mounts a cartridge (not shown) filled with ink or a reaction liquid.

The ink jet head 3 is means for ejecting the ink and the reaction liquid to the recording medium M and adhering them. One or more ink jet heads 3 are mounted on the carriage 2 which moves in the width direction of the recording medium M, that is, in a direction (main operation direction) intersecting the transport direction A of the recording medium M in FIG. 1. Droplets of the ink or the reaction liquid are ejected and adhered to the recording medium by moving the ink jet head 3 along with the movement of the carriage 2.

Figure 2:
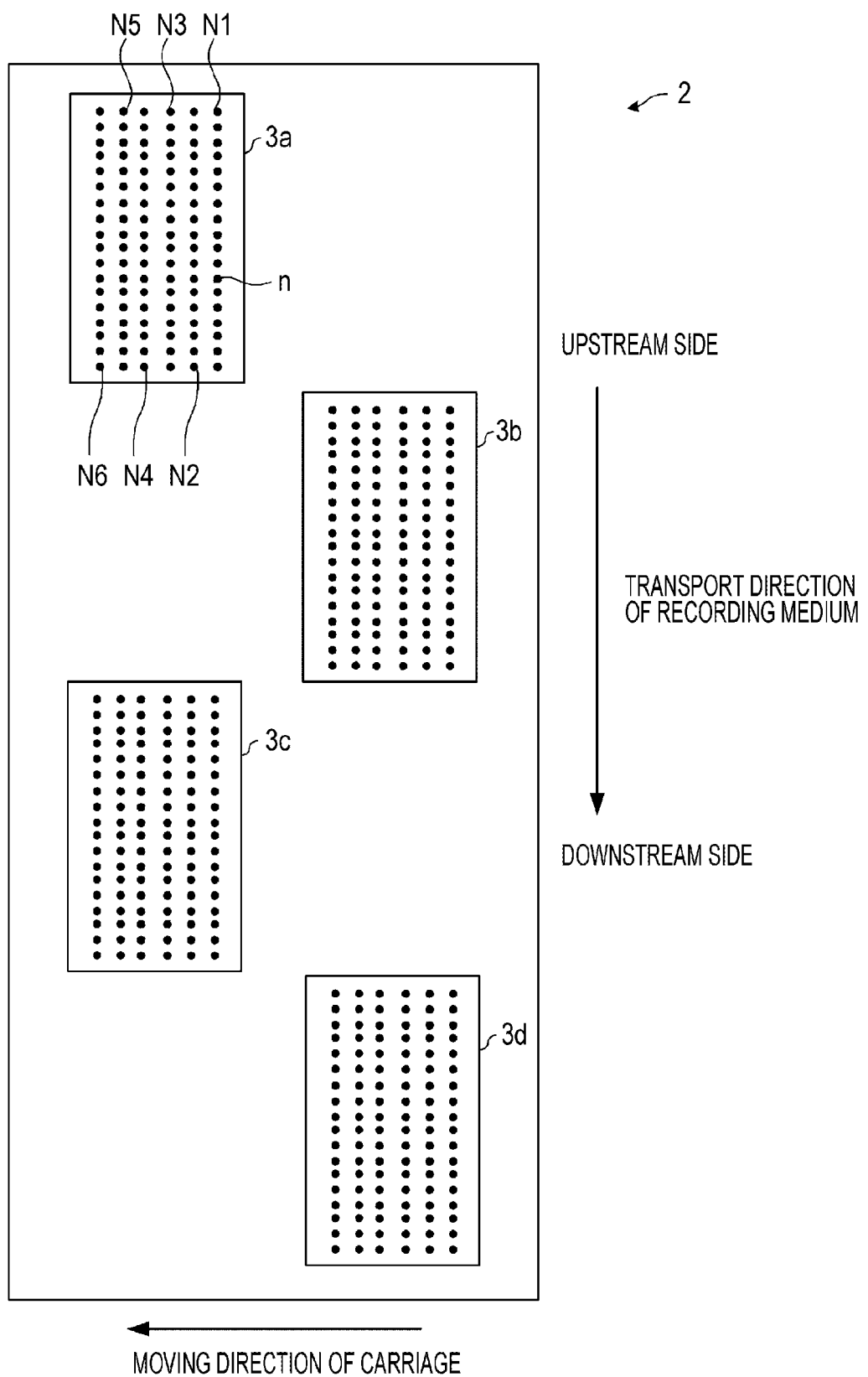
FIG. 2 is a schematic diagram showing an exemplified arrangement of a serial type ink jet head.

An exemplified arrangement of the ink jet head 3 is shown. In FIG. 2, four ink jet heads 3a, 3b, 3c and 3d are mounted on the carriage 2. Each head has a plurality of nozzle rows (N1, N2, N3, N4, N5, N6) (6 rows in FIG. 2). In each nozzle row, a plurality of nozzles n are provided at a predetermined inter-nozzle distance in a sub-operation direction which is the transport direction of the carriage 2, but the number of nozzles is not limited. FIG. 2 shows a head configuration (headset) in which four ink jet heads 3a, 3b, 3c and 3d are arranged in a direction in which nozzle rows extend.

As described later, in the recording method according to the present embodiment, the reaction liquid is filled in, for example, the ink jet head 3a among the four ink jet heads 3a, 3b, 3c and 3d, which is the head on the most upstream side in the transport direction of the recording medium M, and the ink is filled in the ink jet heads 3b to 3d in order from the ink having lower reactivity with the reaction liquid.

Figure 3:
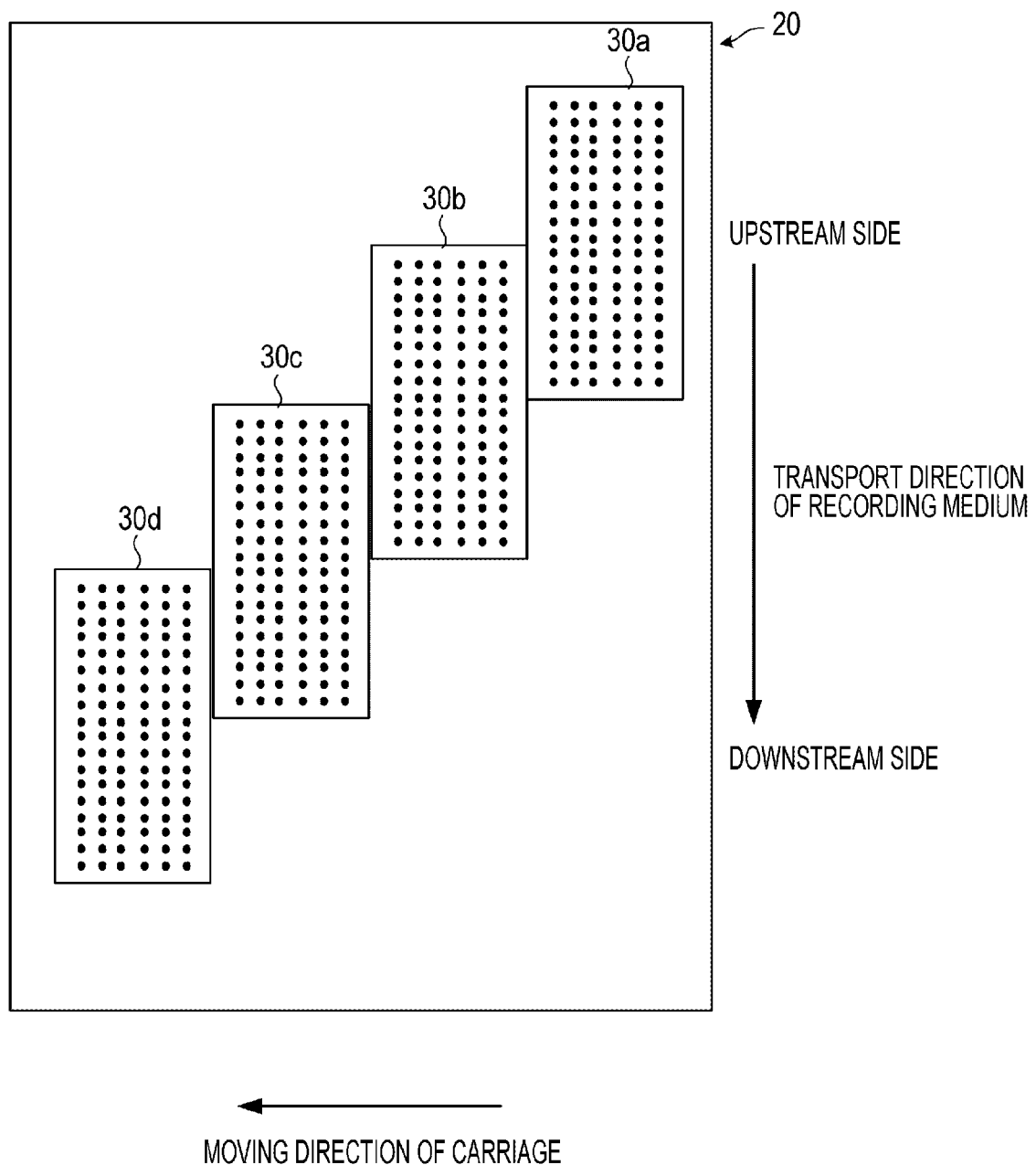
FIG. 3 is a schematic diagram of another exemplified arrangement of a serial type ink jet head.

As well as the arrangement of the ink jet head 3 illustrated in FIG. 2, the arrangement of the four ink jet heads 30a, 30b, 30c and 30d mounted on the carriage 20 is shifted by half a length of the head in a direction in which the nozzle rows (N1, N2, N3, N4, N5, N6) extend such that the ink jet heads 30a, 30b, 30c and 30d overlaps each other by half the distance of the head when viewed from the transport direction of the recording medium M, as shown in FIG. 3.

In the arrangement shown in FIG. 3, the reaction liquid is filled in, for example, the ink jet head 30a among the four ink jet heads 30a, 30b, 30c and 30d, which is the head on the most upstream side in the transport direction of the recording medium M, and the ink is filled in the ink jet heads 30b to 30d in order from the ink having lower reactivity with the reaction liquid. As a head configuration, for example, the respective ink jet heads are arranged such that at least a part of the head that ejects the second ink composition is located on the upstream side of the head that ejects the first ink composition in the transport direction of the recording medium M.

Figure 4:
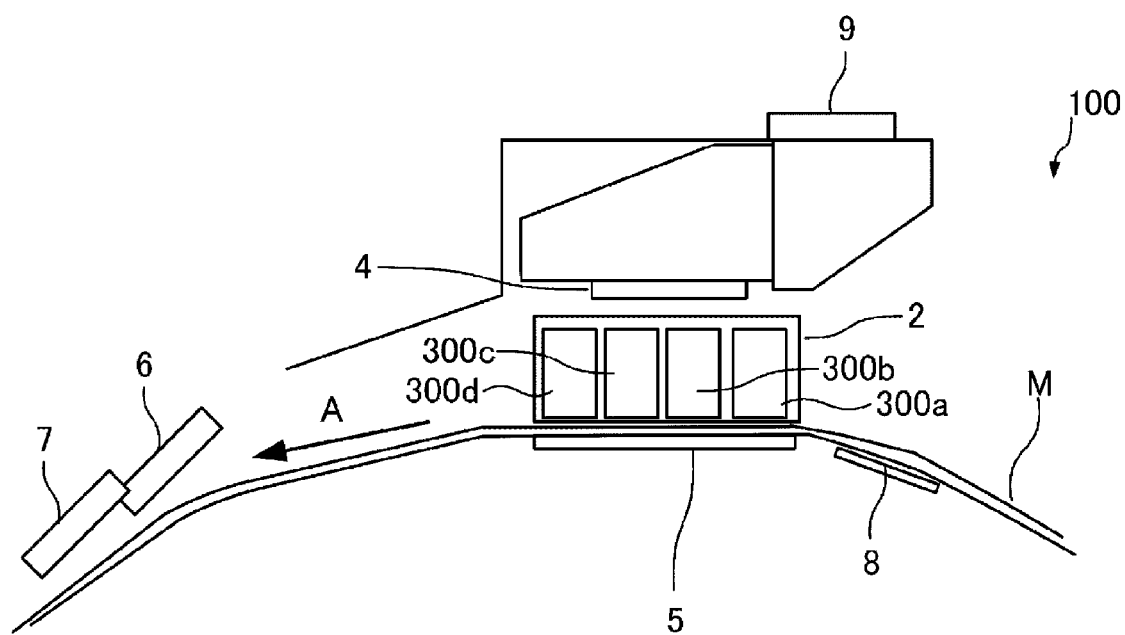
FIG. 4 is a schematic diagram of an example of a recording apparatus including a line type ink jet head.

In a case where the single scanning is performed using the line type ink jet head as the ink jet head, the four ink jet heads 300a, 300b, 300c and 300d are arranged from the upstream side toward the downstream side in the transport direction A of the recording medium M, as shown in FIG. 4. In this case, the reaction liquid is also filled in the ink jet head 300a which is the head on the most upstream side in the transport direction of the recording medium M, and the ink is filled in the ink jet heads 300b to 300d in order from the ink having lower reactivity with the reaction liquid.

Examples of a method for ejecting the reaction liquid from the nozzle include a method in which a strong electric field is applied between the nozzle and an acceleration electrode placed in front of the nozzle to continuously eject ink droplets from the nozzle, and the ink droplets are ejected in accordance with a recording information signal while the ink droplets fly between deflecting electrodes (electrostatic suction); a method in which a pressure is applied to the ink with a small pump, and the nozzle is mechanically vibrated by a crystal oscillator or the like, thereby forcibly ejecting the ink droplets; a method in which a pressure and a recording information signal are simultaneously applied to the ink by a piezoelectric element to eject and record the ink droplets (piezoelectric); a method in which the ink is heated and foamed by a microelectrode in accordance with the recording information signal, and thus the ink droplets are ejected/recorded (thermal jet).

The ink jet recording apparatus 1 may include the IR heater 4 and the platen heater 5 for heating the recording medium M upon ejecting the ink composition from the ink jet head 3. Alternatively, upon ejecting the ink composition, the recording medium may not be heated and the ink composition may be ejected to the recording medium at room temperature (primary heating or primary drying). In the present embodiment, at least one of the IR heater 4 and the platen heater 5 may be used when heating the recording medium M in the ink composition adhering step described later.

It is possible to heat the recording medium M from the ink jet head 3 side by using the IR heater 4. Consequently, although the ink jet head 3 is also easily heated at the same time, the temperature on a surface of the recording medium M can be raised without being influenced by a thickness of the recording medium M as compared with a case where the recording medium M is heated from the backside by the platen heater 5 and the like. In a case where the platen heater 5 is used for heating the recording medium M, the recording medium M can be heated from the side opposite to the ink jet head 3 side. Consequently, it is difficult for the ink jet head 3 to be relatively heated.

The upper limit of a surface temperature of the recording medium M by the IR heater 4 and the platen heater 5 is preferably 45° C. or less, more preferably 40° C. or less, still more preferably 38° C. or less, further still more preferably 35° C. or less. The lower limit of the surface temperature of the recording medium M is preferably 25° C. or higher, more preferably 30° C. or higher, still more preferably 32° C. or higher. Consequently, the radiation heat received from the IR heater 4 and the platen heater 5 is small or no heat is received, so that drying and composition variation of the ink composition in the ink jet head 3 can be suppressed, and the ink and resin are welded to an inner wall of the ink jet head 3 can also be suppressed. Furthermore, it is possible to fix the ink in the early phase and to improve image quality.

The curing heater 6 is for drying and curing the ink composition adhered to the recording medium M (secondary heating or secondary drying). The curing heater 6 heats the recording medium M on which the image is recorded, moisture or the like contained in the ink composition evaporates more rapidly and the resin microparticles contained in the ink composition causes an ink film to be formed. Accordingly, the ink film is strongly fixed (adhered) on the recording medium M, and the film forming property is excellent, thereby obtaining the excellent high-quality image in a short time. The upper limit of the surface temperature of the recording medium M by the curing heater 6 is preferably 120° C. or less, more preferably 100° C. or less, still more preferably 90° C. or less. The lower limit of the surface temperature of the recording medium M is preferably 60° C. or higher, more preferably 70° C. or higher, still more preferably 80° C. or higher. In a case where the temperature falls within the above range, a high quality image can be obtained in a short time.

The ink jet recording apparatus 1 may have a cooling fan 7. After drying the ink composition recorded on the recording medium M, the ink composition on the recording medium M is cooled by the cooling fan 7, whereby an ink coating film can be formed on the recording medium M with high adhesion.

The ink jet recording apparatus 1 may include a preheater 8 that heats (preheats) the recording medium M in advance before the ink composition and the reaction liquid are adhered to the recording medium M. Furthermore, the recording apparatus 1 may be provided with a ventilation fan 9 so that the ink composition and the reaction liquid adhered to the recording medium M are more efficiently dried.

1.2 Ink Composition

Next, the components contained in and optionally contained in the ink composition used in the recording method according to the present embodiment will be described in detail.

In the present embodiment, an ink composition having higher reactivity with the reaction liquid is used as the first ink composition, and an ink composition having lower reactivity with the reaction liquid than that of the first ink composition is used as the second ink composition.

The reactivity with the reaction liquid can be confirmed by the physical property value of a mixture upon mixing the reaction liquid and the ink. For example, increase in the viscosity of the mixture is confirmed when the ink is mixed with a 0.3 M aqueous solution of magnesium sulfate (test liquid) at a mass ratio of 1:1. The ink with the higher viscosity increase rate can be defined as the ink having high reactivity. Viscosity increase is viscosity increase (magnification) of the ink mixture after mixing with the test liquid, with respect to the initial ink before mixing with the test liquid. The viscosity can be measured, for example, at 25° C. using a viscometer (manufactured by Anton Paar, trade name "MCR-72"). A sample used for viscosity measurement shall be collected in a state where the aforementioned mixture after mixing is thoroughly stirred so that the components are apparently uniform.

The viscosity increase of the first ink composition is preferably 5 times or more, more preferably 10 times or more. Although it is not limited, the upper limit is preferably 30 times or less, more preferably 20 times or less.

On the other hand, the viscosity increase of the second ink composition is preferably less than 5 times, more preferably 3 times or less. Although it is not limited, the lower limit is preferably 0.1 times or more, more preferably 0.5 times or more, still more preferably 1 time or more.

A difference between the viscosity increase (magnification) of the first ink composition and the viscosity increase (magnification) of the second ink composition is preferably 1 or more, more preferably 3 or more. Although the upper limit is not limited, it is preferably 30 or less.

The reactivity of the ink can be controlled by adjusting the type and content of components that influence the reactivity of the components contained in the ink, such as components that react with the test liquid and the like. The components that react with the test liquid include, but are not limited to, colorants, resin microparticles, and the like.

In the present embodiment, the ink composition is preferably an aqueous ink jet ink composition. The "aqueous" ink jet ink composition in the invention is a composition which uses water as a main solvent and does not use an organic solvent as a main solvent. The content of water in the ink composition (100 mass %) is preferably 40 mass % or more, more preferably 50 mass % or more, still more preferably 60 mass % or more, particularly preferably 70 mass % or more. The content of the organic solvent in the ink composition is preferably 30 mass % or less, more preferably 25 mass % or less, particularly preferably 20 mass % or less, based on 100 mass % of the composition.

1.2.1. Colorant

In the present embodiment, the ink composition includes a colorant. Both a dye and a pigment can be used as the colorant, but a pigment is preferably used since it has a property of discoloration resistance against light, gas and the like. An image formed on the recording medium using a pigment is not only excellent in image quality but also excellent in water resistance, gas resistance, light resistance and the like, as well as preservability. This property is remarkably exhibited when the image is formed on the recording medium which is an ink non-absorbing or low absorbing medium.

In the present embodiment, the colorant is a component which easily reacts with the reaction liquid. Therefore, the ink composition having the larger content of the colorant is used as the first ink composition (deep color ink), and the ink composition having the colorant content lower than that of the first ink composition is used as the second ink composition (light color ink). The dark color ink and the light color ink have the same color type. In this case, when the reactivity of the ink depends on the content of the colorant, the reactivity of the second ink composition is preferably lower than that of the first ink composition.

In the present embodiment, in a case of using inks of the same color type, "the same color type" means "having substantially the same hue angle." That is, a difference between hue angles ∠H° of the respective recorded images recorded on the recording medium using the first and second ink compositions falls under 30°. Hue angle ∠H° is defined in the CIELAB color space and calculated by $\angle H° = \tan^{-1}(b*/a*)+180$ (in a case of $a*<0$) or $\angle H° = \tan^{-1}(b*/a*)+360$ (in a case of $a*>0$). $a*$ and $b*$ represent perceptual chromaticity indices defined in the CIELAB color space. The difference between hue angles is preferably under 20°, more preferably under 10°.

Alternatively, the ink containing the same type of colorant as the colorant contained in the ink for determining the color of the ink may be ink of the same color type. Alternatively, inks with the names indicating substantially the same color and different color material concentration, such as black ink, deep black ink, pale black ink, dark black ink, light black ink, gray ink, etc., or inks with the names indicating that colors are substantially the same but features other than colors are different, such as black ink, matte black ink, photo black ink, etc. may be considered as the inks of the same color type.

Alternatively, inks belonging to the same group when categorizing into, for example, yellow ink, cyan ink and the like, which will be described later, may be considered as the inks of the same color type.

In the present embodiment, the first ink composition and the second ink composition may be inks that are not the inks of the same color type. In this case, a degree of freedom in designing the recording method is high. In this case, by separately setting the type of the colorant, or type and content of the components affecting the reactivity of the ink other than the colorant, the reactively of the second ink composition can be lowered than that of the first ink composition.

The first ink composition and the second ink composition may be the inks of the same color type or of the different color type, and the second ink composition may be the ink having a smaller content of the colorant than that of the first ink composition. In this case, the second ink composition is easily formed as the ink with the further enhanced ejection stability.

The pigment usable in the present embodiment is not particularly limited, but examples thereof include inorganic pigments and organic pigments. As the inorganic pigment, in addition to titanium oxide and iron oxide, carbon black produced by a publicly known method such as contact method, furnace method, thermal method and the like can be used. Meanwhile, examples of the organic pigment include azo pigments (including azo lake, insoluble azo pigment, condensed azo pigment, chelate azo pigment and the like), polycyclic pigments (for example, phthalocyanine pigment, perylene pigment, perinone pigment, anthraquinone pigment, quinophthalone pigment and the like), nitro pigments, nitroso pigments, aniline black and the like.

Among specific examples of pigments usable in the present embodiment, carbon black can be considered as a black pigment. Examples of carbon black include, but are not limited to, furnace black, lamp black, acetylene black, channel black or the like (C.I. Pigment Black 7), and commercially available products such as Nos. 2300, 900, MCF88, No. 20B, No. 33, No. 40, No. 45, No. 52, MA7, MA8, MA77, MA100, No. 2200B, and the like (trade names, collectively manufactured by Mitsubishi Chemical Corporation); Color Black FW1, FW2, FW 2V, FW18, FW200, 5150, S160, 5170, Printex 35, U, V, 140U, Special Black 6, 5, 4A, 4, 250, and the like (trade names, collectively manufactured by Degussa); Conductex SC, Raven 1255, 5750, 5250, 5000, 3500, 1255, 700, and the like (trade names, collectively manufactured by Columbia Carbon); Rigall 400R, 330R, 660R, Mogul L, Monarch 700, 800, 880, 900, 1000, 1100, 1300, 1400, Elftex 12, and the like (trade names, collectively manufacture by Cabot).

A white pigment is not particularly limited, but examples thereof include white inorganic pigments such as C.I. Pigment White 6, 18, 21, titanium oxide, zinc oxide, zinc sulfide, antimony oxide, magnesium oxide, and zirconium oxide. In addition to these white inorganic pigment, it is also possible to use a white organic pigment such as white hollow resin microparticles and polymer particles.

A pigment used for yellow ink is not particularly limited, but examples thereof include C.I. Pigment Yellow 1, 2, 3, 4, 5, 6, 7, 10, 11, 12, 13, 14, 16, 17, 24, 34, 35, 37, 53, 55, 65, 73, 74, 75, 81, 83, 93, 94, 95, 97, 98, 99, 108, 109, 110, 113, 114, 117, 120, 124, 128, 129, 133, 138, 139, 147, 151, 153, 154, 155, 167, 172, and 180.

A pigment used for magenta ink is not particularly limited, but examples thereof include C.I. Pigment Red 1, 2, 3, 4, 5, 6, 7, 8, 9, 10, 11, 12, 14, 15, 16, 17, 18, 19, 21, 22, 23, 30, 31, 32, 37, 38, 40, 41, 42, 48 (Ca), 48 (Mn), 57 (Ca), 57:1, 88, 112, 114, 122, 123, 144, 146, 149, 150, 166, 168, 170, 171, 175, 176, 177, 178, 179, 184, 185, 187, 202, 209, 219, 224, and 245, or alternatively C.I. Pigment Violet 19, 23, 32, 33, 36, 38, 43, and 50.

A pigment used for cyan ink is not particularly limited, but examples thereof include C.I. Pigment Blue 1, 2, 3, 15, 15:1, 15:2, 15:3, 15:4, 16, 18, 22, 25, 60, 65, 66, C.I. Bat Blue 4 and 60.

Pigments used for color inks other than magenta, cyan, and yellow are not particularly limited, and examples thereof include C.I. Pigment Green 7, 10, C.I. Pigment Brown 3, 5, 25, 26, C.I. Pigment Orange 1, 2, 5, 7, 13, 14, 15, 16, 24, 34, 36, 38, 40, 43, and 63.

A pearl pigment is not particularly limited, but examples thereof include pigments having pearly luster or interference gloss such as titanium dioxide-coated mica, fish scale foil, bismuth oxychloride and the like.

A metallic pigment is not particularly limited, but examples thereof include particles made of a single substance or an alloy such as aluminum, silver, gold, platinum, nickel, chromium, tin, zinc, indium, titanium, copper and the like.

The content of the pigment contained in the ink composition is preferably 0.1 mass % or more and 15 mass % or less, more preferably 0.5 mass % or more and 10 mass % or less, still more preferably 1.0 mass % or more and 7 mass % or less, based on the total mass (100 mass %) of the ink composition.

It is necessary to stably disperse and retain the pigment in water in order to apply the pigment to the ink composition. Examples of such a method include a method of dispersing the pigment with a dispersant resin such as a water-soluble resin and/or a water-dispersible resin (hereinafter, a pigment dispersed by this method is referred to as "resin-dispersed pigment"); a method of dispersing the pigment with a surfactant such as a water-soluble surfactant and/or a water-dispersible surfactant (hereinafter, the pigment dispersed by this method is referred to as "surfactant-dispersed pigment"); a method in which a hydrophilic functional group is chemically and physically introduced to a surface of the pigment particle so that it can be dispersed and/or dissolved in water without a dispersant such as the resin or surfactant (hereinafter, the pigment dispersed by this method is referred to as "surface-treated pigment") and the like. In the present embodiment, any of the resin-dispersed pigment, the surfactant-dispersed pigment, and the surface-treatment pigment can be used in the ink composition, and it is also possible to use a mixture of them as required.

Examples of the dispersant resin used for the resin-dispersed pigment include polyvinyl alcohols, polyvinyl pyrrolidones, polyacrylic acid, acrylic acid-acrylonitrile copolymers, vinyl acetate-acrylic acid ester copolymers, acrylic acid-acrylic acid ester copolymers, styrene-acrylic acid copolymers, styrene-methacrylic acid copolymer, styrene-methacrylic acid-acrylic acid ester copolymer, styrene-α-methylstyrene-acrylic acid copolymer, styrene-α-methylstyrene-acrylic acid-acrylic acid ester copolymer, styrene-maleic acid copolymer, styrene-maleic anhydride copolymer, vinyl naphthalene-acrylic acid copolymer, vinyl naphthalene-maleic acid copolymers, vinyl acetate-maleic acid ester copolymers, vinyl acetate-crotonic acid copolymers, vinyl acetate-acrylic acid copolymers and the like, and salts thereof. Among these, in particular, it is preferable that a copolymer of a monomer having a hydrophobic functional group and a monomer having a hydrophilic functional group, and a polymer composed of a monomer having both a hydrophobic functional group and a hydrophilic functional group be employed. As a form of the copolymer, any of a random copolymer, a block copolymer, an alternating copolymer, and a graft copolymer can be used.

Examples of the salt include salts with a base compound such as ammonia, ethylamine, diethylamine, triethylamine, propylamine, isopropylamine, dipropylamine, butylamine, isobutylamine, diethanolamine, triethanolamine, tri-iso-propanolamine, aminomethylpropanol, morpholine and the like. The adding amount of these basic compounds is not particularly limited as long as it is not less than the neutralization equivalent of the dispersant resin.

A molecular weight of the dispersant resin is preferably in the range of 1,000 to 100,000, more preferably in the range of 3,000 to 10,000, as a weight average molecular weight. In a case where the molecular weight falls within the above range, stable dispersion of the colorant in water is obtained, and viscosity control is easy when applying to the ink composition.

As the aforementioned dispersant resin, a commercially available product can also be used. In particular, examples thereof include Joncryl 67 (weight average molecular weight: 12,500, acid value: 213), Joncryl 678 (weight average molecular weight: 8,500, acid value: 215), Joncryl 586 (weight average molecular weight: 4,600, Acid value: 108), Joncryl 611 (weight average molecular weight: 8,100, acid value: 53), Joncryl 680 (weight average molecular weight: 4,900, acid value: 215), Joncryl 682 (weight average molecular weight: 1,700, acid value: 238), Joncryl 683 (weight average molecular weight: 8,000, acid value: 160), Joncryl 690 (weight average molecular weight: 16,500, acid value: 240) (collectively manufactured by BASF Japan), and the like.

Examples of the surfactant used for the surfactant-dispersed pigment include anionic surfactants such as alkane sulfonate, α-olefin sulfonate, alkylbenzene sulfonate, alkyl naphthalene sulfonate, acyl methyl taurate, dialkyl sulfosuccinate, alkylsulfuric acid ester salts, sulfated olefins, polyoxyethylene alkyl ether sulfuric acid ester salts, alkylphosphoric acid ester salts, polyoxyethylene alkyl ether phosphoric acid ester salts, monoglyceride phosphoric acid ester salts, and the like; amphoteric surfactants such as alkylpyridinium salts, alkylamino acid salts, alkyl dimethyl betaine, and the like; and nonionic surfactants such as polyoxyethylene alkyl ether, polyoxyethylene alkyl phenyl ether, polyoxyethylene alkyl ester, polyoxyethylene alkylamide, glycerol alkyl esters, sorbitan alkyl esters, and the like.

The adding amount of the dispersant resin or the surfactant to the pigment is preferably 1 part by mass to 100 parts by mass, more preferably 5 parts by mass to 50 parts by mass with respect to 100 parts by mass of the pigment. Falling within this range, dispersion stability of the pigment in water can be secured.

Examples of the surface-treated pigment include a hydrophilic functional group such as —OM, —COOM, —CO—, —$SO_3$M, —$SO_2NH_3$, —R$SO_3$M, —$PO_3$HM, —$PO_3M_3$, —$SO_3$NHCOR, —$NH_3$, —$NR_3$ (provided that M represents a hydrogen atom, an alkali metal, ammonium or organic ammonium, and R represents an alkyl group having 1 to 12 carbon atoms, a phenyl group optionally having a substituent, or a naphthyl group optionally having a substituent), and the like. These functional groups are physically and/or chemically introduced by grafting directly them on the pigment particle surface and/or via other groups. Examples of the polyvalent group include an alkylene group having 1 to 12 carbon atoms, a phenylene group optionally having a substituent, a naphthylene optionally having a substituent, and the like.

Furthermore, as the aforementioned surface-treated pigment, it is preferable to use a pigment subjected to a surface treatment such that —$SO_3M$ and/or —$RSO_3M$ (M is a counter ion and is hydrogen ion, an alkali metal ion, an ammonium ion, or an organic ammonium ion) is chemically bond on a surface of the pigment particle by a sulfur-containing treating agent, i.e. a pigment which is dispersed in a solvent that does not have an active proton nor reactivity with sulfonic acid, and in which the pigment is insoluble or poorly soluble, and subjected to a surface treatment such that —$SO_3M$ and/or —$RSO_3M$ is chemically bond on the surface of the pigment particle by a complex of a tertiary amine and amidosulfuric acid, or sulfur trioxide, whereby the pigment can be dispersed and/or dissolved in water.

As the surface treatment means for grafting the functional group or a salt thereof onto the surface of the pigment particle directly or via a polyvalent group, various known surface treatment means can be applied. Examples thereof include means for applying ozone or a sodium hypochlorite solution to commercially available oxidized carbon black and further oxidizing the carbon black to further hydrophilize the surface thereof (for example, JP-A-7-258578, JP-A-8-3498, JP-A-10-120958, JP-A-10-195331, and JP-A-10-237349); means for treating carbon black with 3-amino-N-alkyl substituted pyridium bromide (for example, JP-A-10-195360 and JP-A-10-330665); means for dispersing an organic pigment in a solvent in which the organic pigment is insoluble or hardly soluble, and introducing a sulfone group into the surface of the pigment particle with a sulfonating agent (for example, JP-A-8-283596, JP-A-10-110110 and JP-A-10-110111); means for dispersing the organic pigment in a basic solvent which forms a complex with sulfur trioxide and treating the surface of the organic pigment by adding sulfur trioxide to introduce a sulfone group or sulfonamino group (for example, JP-A-10-110114), and the like. However, the means for preparing the surface-treated pigment used in the invention is not limited to these means.

The number of functional groups grafted to one pigment particle may be single or plural. The type and degree of the functional group to be grafted may be appropriately determined in consideration of dispersion stability in the ink, color density, drying property on the front face of the ink jet head, and the like.

As a method of dispersing the resin-dispersed pigment, the surfactant-dispersed pigment and the surface-treated pigment in water, it is preferable to disperse a pigment, water and a dispersant resin for the resin-dispersed pigment; a pigment, water and a surfactant for the surfactant-dispersed pigment; and a surface-treated pigment and water for the surface-treated pigment, respectively with a water-soluble organic solvent or a neutralizer if needed, using a conventionally used dispersing machine such as a ball mill, sand mill, attritor, roll mill, agitator mill, Henschel mixer, a colloid mill, an ultrasonic homogenizer, a jet mill, an ang-mill, or the like. In this case, it is preferable that the pigment be dispersed until the average particle diameter is in the range of 20 nm to 500 nm, more preferably in the range of 50 nm to 200 nm, so as to ensure the dispersion stability of the pigment in water.

The reactivity of the colorant can be adjusted by adjusting the amount of the ionic functional group contained in the dispersant resin covering the colorant or the surface of the colorant, or alternatively, changing the type of the ionic functional group.

1.2.2. Resin Microparticles

In the present embodiment, it is preferable that the ink composition contain resin microparticles. The resin microparticles are components which easily react with the reaction liquid, and agglomerate by reaction with components in the reaction liquid to solidify the ink composition, and further have the function of firmly fixing the ink solidified substance on the recording medium.

In the present embodiment, the resin microparticles are obtained by dispersing a resin which is hardly soluble or insoluble in the solvent of the ink composition used in the present embodiment into fine particles (that is, in an emulsion state or a suspension state). It is also called "binder solid content" or "resin emulsion".

The resin microparticles used in the present embodiment are not particularly limited, and examples thereof include homopolymers or copolymers, fluororesins, and natural resins of (meth)acrylic acid, (meth)acrylic acid ester, acrylonitrile, cyanoacrylate, acrylamide, olefin, styrene, vinyl acetate, vinyl chloride, vinyl alcohol, vinyl ether, vinyl pyrrolidone, vinyl pyridine, vinyl carbazole, vinyl imidazole, and vinylidene chloride. Among these, it is preferable to use an acrylic resin which is a homopolymer or copolymer of at least one of (meth)acrylic monomers such as (meth)acrylic acid, (meth)acrylic acid ester, acrylamide, acrylonitrile, cyanoacrylate and the like. Among the acrylic resins, it is preferable to use a copolymer of a (meth)acrylic monomer and a vinyl monomer. Examples of the vinyl monomer include, but is not limited to, styrene and the like, and a styrene-acrylic copolymer resin which is a copolymer of a (meth)acrylic monomer and styrene is particularly preferable. The aforementioned copolymer may be in any form of a random copolymer, a block copolymer, an alternating copolymer, and a graft copolymer. As the resin, in addition to the aforementioned resins, polyurethane resins, polyester resins, and polyether resins are preferably used.

The resin microparticle may be a linear or branched polymer, or a three-dimensionally crosslinked polymer. The three-dimensionally crosslinked polymer is preferable.

In order to obtain the above resin in particle state, the following method can be adopted. Any of these methods may be used, and several methods may be combined if necessary. Examples of the method include a method in which a polymerization catalyst (polymerization initiator) and a dispersant are mixed in a monomer constituting a desired resin and polymerized (that is, emulsion polymerization); a method in which a resin having a hydrophilic moiety is dissolved in a water-soluble organic solvent, the solution is mixed in water, and then the water-soluble organic solvent is removed by distillation or the like; and a method in which the resin is dissolved in a water-insoluble organic solvent, and the solution is mixed with a dispersant in an aqueous solution, and the like. The aforementioned method can be appropriately selected depending on the type and properties of the resin to be used. The dispersant used for dispersing the resin is not particularly limited, but examples thereof include anionic surfactants (for example, sodium dodecylbenzenesulfonate, sodium lauryl phosphate, polyoxyethylene alkyl ether sulfate ammonium salt, etc.), and nonionic surfactants (for example, polyoxyethylene alkyl ether, polyoxyethylene alkyl ester, polyoxyethylene sorbitan fatty acid ester, polyoxyethylene alkyl phenyl ether, etc.). These may be used alone or in combination of two or more.

Those resins can be obtained by known materials and methods in a case where the aforementioned resins are used in the state of particles (emulsion state or suspension state). For example, it is also possible to use those described in JP-B-62-1426, JP-A-3-56573, JP-A-3-79678, JP-A-3-160068, and JP-A-4-18462. Commercially available products can also be used, and examples thereof include Microgel E-1002, Microgel E-5002 (trade names, collectively manufactured by Nippon Paint), Boncoat 4001, Boncoat 5454 (trade names, collectively manufactured by Dainippon Ink and Chemicals), SAE1014 (trade name, manufactured by Zeon Corporation), SAIBINOL SK-200 (trade name, manufactured by Saiden Chemical Industry), JURYMER AT-613 (trade name, manufactured by TOAGOSEI), vinyran 700 (trade name, manufactured by Nisshin Chemical Industry), Joncryl 7100, Joncryl 390, Joncryl 711, Joncryl 511, Joncryl 7001, Joncryl 632, Joncryl 741, Joncryl 450, Joncryl 840, Johncrill 74J, Joncryl HRC-1645J, Joncryl 734, Joncryl 852, Joncryl 7600, Joncryl 775, Joncryl 537J, Joncryl 1535, Joncryl PDX-7630A, Joncryl 352J, Joncryl 352D, Johncryl PDX-7145, Joncryl 538J, Joncryl 7640, Joncryl 7641, Joncryl 631, Joncryl 790, Joncryl 780, Joncryl 7610 (trade names, collectively manufactured by BASF Japan), and the like.

The resin microparticle may contain a composite resin. The composite resin is composed of two or more resins which are different from each other in the configuration (at least any of type and content ratio) of the monomer components constituting the resin as the resin for fixing, regardless of which moiety the two or more resins constitute. The two or more resins are not limited to those in which the resin compositions are discontinuously distinguishable at the boundary, but may be those in which the constitutions of the monomer components may be different continuously.

In particular, as the resin microparticles, it is preferable to use, from the viewpoint that the properties of the resin can be changed in the peripheral portion and the central portion of the resin, respectively, a core-shell resin in which, out of two or more resins, one serves as a core resin and the other as a shell resin, and the core resin is mainly used as a resin constituting the central portions of resin microparticles, and the shell resin is mainly used as a resin constituting the peripheral portion of the resin microparticles. In this case, the shell resin may constitute at least a part of the peripheral portion of the resin microparticles. The core-shell resin is described as an example of the composite resin. However, the composite resin is not limited to the core-shell resin, and the same effect can be obtained as long as it is a composite resin. The core-shell resin is preferable from the viewpoint that the solubility of the resin can be easily adjusted since the core and the shell can be independently controlled their degree of crosslinking and glass transition temperature.

Furthermore, even in a resin which is not the core-shell resin, it is possible to adjust the dissolution duration depending on the glass transition temperature or the degree of crosslinking of the resin. The resin can also be adjusted according to the composition such as the type and amount of monomers used for resin synthesis, not limited to the glass transition temperature and the degree of crosslinking.

In a case where the resin microparticles are used in a particle state, it is preferable that the average particle diameter thereof be preferably in the range of 5 nm or more and 400 nm or less, more preferably in the range of 50 nm or more and 250 nm or less, from the viewpoint of ensuring storage stability and ejection reliability of the ink composition. In a case where the average particle diameter of the resin microparticles falls within the above range, clogging of the nozzle can be reduced since excellent film forming property is ensured and large lumps are hardly formed even when aggregated. The average particle diameter in this specification is on a volume basis unless otherwise specified. As a measuring method, for example, measurement can be carried out by a particle size distribution measuring apparatus using dynamic light scattering theory as a measurement principle. An example of such a particle size distribution measuring apparatus is "Microtrac UPA" manufactured by Nikkiso.

The glass transition temperature (Tg) of the resin microparticles is preferably, for example, −20° C. to 100° C., more preferably −10° C. to 90° C., and still more preferably from 0° C. to 80° C.

The lower limit of the content of the resin microparticles is preferably 0.1 mass % or more, more preferably 0.5 mass % or more, still more preferably 2 mass % or more, further still more preferably 4 mass % or more, particularly preferably 5 mass % or more, based on the total mass (100 mass %) of the ink composition in terms of solid content. The upper limit of the content of the resin is preferably 20 mass % or less, more preferably 15 mass % or less, still more preferably 12 mass % or less, based on the total mass (100 mass %) of the ink composition. In a case where the content of the resin microparticles falls within the above range, clogging reliability during recording is ensured and an image excellent in scratch resistance is formed on the recording medium which is an ink non-absorbing or low absorbing medium.

In the present embodiment, it is preferable that the content of the resin microparticles of the second ink composition of which reactivity with the reaction liquid is lower than that of the first ink composition be larger than the content of the resin microparticles of the first ink composition. By containing a large amount of resin microparticles in the second ink composition having low reactivity with the reaction liquid, it is possible to form an image more excellent in scratch resistance and to improve ejection stability during recording.

In particular, the content of the resin microparticles in the second ink composition is larger than the content of the resin microparticles in the first ink composition by preferably 0.5 mass % or more and 5 mass % or less, more preferably 1.0 mass % or more and 4 mass % or less, still more preferably 1.5 mass % or more and 3.5 mass % or more. The content of the resin microparticles contained in the second ink composition is preferably 3 mass % or more, more preferably 3.5 mass % or more, still more preferably 4 mass % or more. In a case where the content of the resin microparticles falls within the above range, scratch resistance of the recorded material can be enhanced particularly in a low duty region using the second ink composition. Clogging reliability during recording in the first ink composition having a large content of the colorant can be ensured.

Furthermore, it is preferable that the resin microparticles contained in the first ink composition and the second ink composition have each the viscosity increase (magnification) of less than 5 times when mixed with 0.3 M magnesium sulfate aqueous solution (test liquid). In a case where the resin microparticles contained in the first ink composition and the second ink composition are mixed with a 0.3 M aqueous solution of magnesium sulfate, the viscosity increase is less than 5 times. It is interpreted as that, when the resin microparticles are a resin difficult to react with the reaction liquid. Therefore, when the ink component reacts with a reaction liquid to form an image, a film is formed by allowing the colorant to settle (react) first and then cover the resin microparticles, so that smooth film formation is available and the scratch resistance is further improved.

The viscosity increase of the resin microparticles is viscosity increase (magnification) calculated from the viscosity of the resin liquid in the mixed liquid obtained by mixing the test liquid with a resin liquid containing water as a medium and having a solid content concentration of the resin microparticles of 1 mass % in a 1:1 mass ratio. Measurement of the viscosity is carried out in the same manner as the confirmation of the viscosity increase of the ink as described above. The viscosity increase of the resin microparticles is more preferably 3 times or less, still more preferably 2 times or less, further still more preferably 1.5 times or less, and particularly preferably 1 time or less.

The reactivity of the resin microparticles can be adjusted by adjusting the amount of ionic functional groups on the surface of the resin microparticles, or alternatively, changing the type of the ionic functional group.

1.2.3. Water

In the present embodiment, it is preferable that the ink composition contain water. Water is a main medium of the ink composition and is a component that evaporates and scatters by heating. It is preferable that the water be pure water such as ion exchanged water, ultrafiltered water, reverse osmosis water, distilled water, or alternatively, one in which ionic impurities are removed as much as possible, such as ultrapure water. The sterilized water obtained by irradiating with ultraviolet rays or adding hydrogen peroxide is desirably used because mold and bacteria can be prevented from generating in a case where a pigment dispersion or the ink composition using such a pigment dispersion is preserved for a long time.

The lower limit of the water content is preferably 40 mass % or more, more preferably 50 mass % or more, still more preferably 55 mass % or more, further still more preferably 60 mass % or more, based on the total mass (100 mass %) of the ink composition. The upper limit of the water content is preferably 90 mass % or less, more preferably 80 mass % or less, still more preferably 70 mass % or less, based on the total mass (100 mass %) of the ink composition.

1.2.4. Organic Solvent

In the present embodiment, the ink composition may contain an organic solvent. By containing the organic solvent in the ink composition, the drying property of the ink composition ejected onto the recording medium is improved, and an image excellent in scratch resistance can be obtained.

The organic solvent used for the ink composition is not particularly limited, but it is preferably a water-soluble organic solvent. By using the water-soluble organic solvent, the ink composition is stably dispersed, the drying property of the ink composition is improved, and a printed image excellent in water resistance and scratch resistance can be obtained.

The organic solvent is not particularly limited, but examples thereof include alcohols such as methanol, ethanol, isopropyl alcohol and the like; ketones or ketoalcohols such as acetone, diacetone alcohol and the like; ethers such as tetrahydrofuran, dioxane and the like; alkylene diols such as hexanediol, pentanediol and the like; alkylene polyols such as glycerin, ethylene glycol, diethylene glycol, triethylene glycol, polyethylene glycol, propylene glycol, dipropylene glycol, tripropylene glycol, polypropylene glycol, propanediol, butanediol and the like; glycol ethers such as ethylene glycol monomethyl ether, diethylene glycol monomethyl ether, diethylene glycol monoethyl ether, diethylene glycol monobutyl ether and the like; and amines having a hydroxyl group such as diethanolamine, triethanolamine and the like.

As the aforementioned alkanediols, diol of alkane having 5 or more carbon atoms can be considered, and the number of carbon atoms is preferably 9 or less.

Examples of the aforementioned alkylene polyols include condensates obtained by condensing two or more molecules of polyol of alkylene having 4 or less carbon atoms and polyol of alkylene having 4 or less carbon atoms with a hydroxyl group. The number of hydroxyl groups in the molecule of the alkylene polyols is 2 or more, and is not limited to but is preferably 4 or less.

Examples of the glycol ethers include lower alkyl ethers of glycols, and the lower alkyls include alkyl having 4 or less carbon atoms.

In the present embodiment, it is preferable that a nitrogen-containing solvent be included as the organic solvent used in the ink composition, from the viewpoint of obtaining a printed image with high solubility of the resin and excellent in water resistance and scratch resistance. As the nitrogen-containing solvent, for example, a cyclic amide solvent and a non-cyclic amide solvent are preferable. Examples of cyclic amide solvent include pyrrolidone solvents and lactams such as ε-caprolactam, and in particular, as the pyrrolidone solvent, N-methyl-2-pyrrolidone, N-ethyl-2-pyrrolidone, N-vinyl-2-pyrrolidone, 2-pyrrolidone, N-butyl-2-pyrrolidone, 5-methyl-2-pyrrolidone and the like are preferable.

Preferable examples of the non-cyclic amide solvent include N, N-dimethylpropanamides such as 3-methoxy-N, N-dimethylpropanamide, 3-butoxy-N, N-dimethylpropanamide, and the like.

Among organic solvents, alkanediols, alkylene polyols, glycol ethers and nitrogen-containing solvents are preferable. It is preferable to use alkylene polyols from the standpoint of improving the moisture retention of the ink composition.

The lower limit of the content of the organic solvent is preferably 5 mass % or more, more preferably 10 mass % or more, still more preferably 15 mass % or more, based on the total mass (100 mass %) of the ink composition. The upper limit of the content of the organic solvent is preferably 30 mass % or less, more preferably 45 mass % or less, still more preferably 20 mass % or less, based on the total mass (100 mass %) of the ink composition.

The normal boiling point of the organic solvent is preferably 180° C. or higher, more preferably 200° C. or higher, still more preferably 220° C. or higher. The upper limit of the normal boiling point of the organic solvent is preferably 300° C. or less, more preferably 270° C. or less, still more preferably 250° C. or less. In a case where the normal boiling point of the organic solvent falls within the above range, ejection stability and scratch resistance are further improved, which is preferable.

The organic solvent that is alkylene polyols having a normal boiling point exceeding 280° C. may absorb moisture of the ink and thicken the ink in the vicinity of the ink jet head, thereby lowering the ejection stability of the ink jet head. Therefore, in the present embodiment, the content of the organic solvent having a normal boiling point exceeding 280° C. is preferably 3 mass % or less, more preferably 2 mass % or less, still more preferably 1 mass % or less, further still more preferably 0.5 mass % or less, and particularly preferably 0.1 mass % or less, based on the total mass (100 mass %) of the ink composition. In this case, since the drying property of the ink composition on the recording medium is enhanced, it is particularly suitable for recording on a low-absorbing or a non-absorbing recording medium, and an excellent image in which the occurrence of blurring is suppressed can be formed. In addition, the stickiness of the printed image obtained is reduced, and water resistance and scratch resistance are excellent. Furthermore, it is preferable that the content of the organic solvent fall within the aforementioned range in terms of the above point, not limited to the organic solvent that is alkylene polyol.

As the organic solvent having a normal boiling point exceeding 280° C., for example, glycerin can be considered. Glycerin has high hygroscopicity and high normal boiling point, which may cause clogging of the ink jet head and malfunctioning of the ink jet head. In addition, glycerin is poor in antiseptic property and easily causes molds and fungi to be propagated, so it is preferable not to contain glycerin.

The lower limit of the content of the organic solvent having a normal boiling point of 280° C. or less as the organic solvent is preferably 5 mass % or more, more preferably 10 mass % or more, particularly preferably 15 mass % or more, based on the total mass (100 mass %) of the ink composition. The upper limit of the content of the organic solvent having a normal boiling point of 280° C. or less is preferably 30 mass % or less, more preferably 25 mass % or less, still more preferably 20 mass % or less, based on the total mass (100 mass %) of the ink composition. In a case where the content of the organic solvent having a normal boiling point of 280° C. or less falls within the above range, the dispersion stability of the pigment and the resin component in the ink, the continuous ejection stability, the wettability of the ink to the recording medium (wet spreadability) and permeability, and drying resistance of the ink are further improved.

1.2.5. Surfactant

In the present embodiment, it is preferable that the ink composition contain a surfactant. The surfactant is not particularly limited, and examples thereof include an acetylene glycol surfactant, a fluorine surfactant, and a silicone surfactant. It is preferable that at least one of them be contained.

The acetylene glycol surfactant is not particularly limited, but one or more selected from an alkylene oxide adduct of 2,4,7,9-tetramethyl-5-decyne-4,7-diol and 2,4,7,9-tetramethyl-5-decyne-4,7-diol, and alkylene oxide adducts of 2,4-dimethyl-5-decyn-4-ol and 2,4-dimethyl-5-decyne-4-ol is preferable. Commercially available products of the acetylene glycol surfactant are not particularly limited, but examples thereof include E series such as Olfine 104 series and Olfine E 1010 (trade names, collectively manufactured by Air Products Japan); Surfynol 465, 61, and DF 110D (trade names, collectively manufactured by Nissin Chemical Industry). The acetylene glycol surfactant may be used alone or in combination of two or more.

The fluorine surfactant is not particularly limited, but examples thereof include perfluoroalkyl sulfonate, perfluoroalkyl carboxylate, perfluoroalkyl phosphate ester, a perfluoroalkyl ethylene oxide adduct, perfluoroalkyl betaine, and a perfluoroalkyl amine oxide compound. Commercially available products of the fluorine surfactant are not particularly limited, but examples thereof include S144, 5145 (trade names, collectively manufactured by Asahi Glass); FC-170C, FC-430, Fluorad-FC4430 (trade names, collectively manufactured by Sumitomo 3M); FSO, FSO-100, FSN, FSN-100, FS-300 (trade names, collectively manufactured by Dupont); FT-250 and 251 (trade names, collectively manufactured by NEOS). The fluorine surfactant may be used alone or in combination of two or more.

The silicone surfactant is not particularly limited, but examples thereof include a polysiloxane-based compound, and polyether-modified organosiloxane. Commercially available products of the silicone surfactant are not particularly limited, but examples thereof include BYK-306, BYK-307, BYK-333, BYK-341, BYK-345, BYK-346, BYK-347, BYK-348, BYK-349 (trade names, collectively manufactured by BYK Additives & Instruments); KF-351A, KF-352A, KF-353, KF-354L, KF-355A, KF-615A, KF-945, KF-640, KF-642, KF-643, KF-6020, X-22-4515, KF-6011, KF-6012, KF-6015, KF-6017 (trade names, collectively manufactured by Shin-Etsu Chemical); and the like. The silicone surfactant may be used alone or in combination of two or more.

Among these, the acetylene glycol surfactant can further improve nozzle clogging recovery performance. On the other hand, the fluorine surfactant and the silicone surfactant are preferable since they can achieve uniformly spreading ink on the recording medium so as not to cause density unevenness or blurring of the ink. Therefore, in the present embodiment, it is more preferable that the ink composition contain at least one of the silicone surfactant and the fluorine surfactant, with the acetylene glycol surfactant.

The lower limit of the content of the acetylene glycol surfactant is preferably 0.1 mass % or more, more preferably 0.3 mass % or more, still more preferably 0.5 mass % or more, based on the total mass (100 mass %) of the ink composition. On the other hand, the upper limit of the content of the acetylene glycol surfactant is preferably 5 mass % or less, more preferably 3 mass % or less, particularly preferably 2 mass % or less. In a case where the content of the acetylene glycol surfactant falls within the above range, the effect of improving the nozzle clogging recovery performance can be easily obtained.

The lower limit of the content of the fluorine surfactant and the silicone surfactant is preferably 0.5 mass % or more, more preferably 0.8 mass % or more. On the other hand, the upper limit of the content is preferably 5 mass % or less, more preferably 3 mass % or less. In a case where the content of the fluorine surfactant and the silicone surfactant falls within the aforementioned ranges, it is desirable that uniformly spreading of ink on the recording medium is achieved so as not to cause density unevenness or blurring of the ink.

1.2.6. Other Components

In the present embodiment, the ink composition may appropriately contain various additives such as an antifoaming agent, a dissolution aid, a viscosity adjusting agent, a pH adjusting agent, a polyolefin wax, an antioxidant, an antiseptic, an antifungal agent, a corrosion inhibitor, a moisturizer which is not an organic solvent, and a chelate for capturing metal ions affecting dispersion and the like, in order to improve the storage stability of the ink composition and the ejection stability from the ink jet head, to improve clogging, or to prevent deterioration of the ink.

Examples of the pH adjusting agent include potassium dihydrogen phosphate, disodium hydrogen phosphate, sodium hydroxide, lithium hydroxide, potassium hydroxide, ammonia, diethanolamine, triethanolamine, triisopropanolamine, potassium carbonate, sodium carbonate, sodium bicarbonate and the like.

Examples of the polyolefin wax include waxes prepared from olefins such as ethylene, propylene, butylene and the like, and copolymers thereof, in particular, polyethylene wax, polypropylene wax, polybutylene wax and the like. Among these, polyethylene wax is preferable from the viewpoint that an image cracking hardly occurs. The polyolefin wax may be used alone or in combination of two or more.

As the polyolefin wax, commercially available polyolefin waxes can be used. In particular, Chemipearl series such as Chemipearl W4005 (trade name, collectively manufactured by Mitsui Chemicals, polyethylene wax) can be considered. Other AQUACER series such as AQUACER 503, 507, 513, 515, 840 (trade names, collectively manufactured by BYK Japan, polyethylene wax); High-tech series such as High-tech E-7025P, E-2213, E-9460, E-9015, E-4A, E-5403P, E-8237 (trade names, manufactured by Toho Chemical Industry); and Nopcoat PEM-17 (trade name, manufactured by San Nopco Limited, polyethylene emulsion). These are commercially available in the form of an aqueous emulsion in which the polyolefin wax is dispersed in water by a conventional method.

The addition of the polyolefin wax is preferable from the viewpoint that it is possible to improve the slipping property against physical contact of the image formed on the ink non-absorbing or low absorbing recording medium and to improve scratch resistance of the image. The content of the polyolefin wax is preferably from 0.01 mass % to 10 mass %, more preferably from 0.05 mass % to 1 mass %, based on the total mass of the ink composition. In a case where the content of the polyolefin wax falls within the above range, the aforementioned effects are sufficiently exhibited.

As the antiseptic/fungicide, for example, sodium benzoate, sodium pentachlorophenol, sodium 2-pyridinethiol-1-oxide, sodium sorbate, sodium dehydroacetate, 1,2-dibenzisothiazolin-3-on and the like can be considered. Examples of commercially available products include Proxel XL2, Proxel GXL (trade names, collectively manufactured by Avecia), Denicide CSA, NS-500W (trade names, collectively manufactured by Nagase Chemtex), and the like.

As the corrosion inhibitor, for example, benzotriazole and the like can be considered.

Examples of the chelate include ethylenediaminetetraacetic acid and salts thereof (disodium ethylenediaminetetraacetate disodium salt, etc.), and the like.

Examples of the moisturizer which is not an organic solvent include moisturizers which are solid at normal temperature, such as trimethylolpropane, sugar and the like.

1.2.7. Method for Preparing Ink Composition

In the present embodiment, the ink composition is obtained by mixing the aforementioned components in an arbitrary order and, if necessary, by filtrating or the like to remove impurities. As a method of mixing the respective components, a method in which materials are sequentially added to a container equipped with a stirrer such as a mechanical stirrer, a magnetic stirrer and the like, stirred and mixed is suitably used. As a filtrating method, centrifugal filtration, filter filtration and the like can be carried out as necessary.

1.2.8. Physical Properties of Ink Composition

In the present embodiment, the surface tension at 20° C. of the ink composition is preferably 18 mN/m or more and 40 mN/m or less, more preferably 20 mN/m or more and 35 mN/m or less, still more preferably 22 mN/m or more and 33 mN/m or less, from the viewpoint of balance between image quality and reliability as ink for ink jet recording. For the measurement of the surface tension, for example, the surface tension when a platinum plate is wetted with the ink under an environment of 20° C. is confirmed using an automatic surface tensiometer CBVP-Z (trade name, manufactured by Kyowa Interface Science).

From the same viewpoint, the viscosity at 20° C. of the ink composition according to the present embodiment is preferably 3 mPa·s or more and 10 mPa·s or less, more preferably 3 mPa·s or more and 8 mPa·s or less. The viscosity can be measured using, for example, a viscoelasticity tester MCR-300 (trade name, manufactured by Pysica) under an environment of 20° C.

1.3. Reaction Liquid

Next, the reaction liquid used in the recording method will be described.

In the present embodiment, the reaction liquid is one which reacts with the components of the ink composition to aggregate, one in which the content of the colorant is 0.2 mass % or less, and one which is not the aforementioned ink composition used for coloring the recording medium but an auxiliary liquid used by being adhered to the recording medium before or after adhering the ink composition.

1.3.1. Coagulant

It is preferable that the reaction liquid used in the present embodiment contain a coagulant for aggregating components of the ink composition. In a case where the reaction liquid contains the coagulant, the coagulant reacts quickly with components such as the colorant and the resin contained in the ink composition in the ink composition adhering step described later.

Accordingly, the dispersed state of the colorant and the resin in the ink composition is destroyed, the colorant and the resin are aggregated, and this aggregate inhibits penetration of the colorant into the recording medium, so that the image quality of the recorded image is superiorly improved.

Examples of the coagulant include a polyvalent metal salt, a cationic compounds (a cationic polymer, a cationic surfactant, etc.), and organic acid. These coagulants may be used alone or in combination of two or more. Among these coagulants, it is preferable to use at least one coagulant selected from the group consisting of a polyvalent metal salt and a cationic resin from the viewpoint of excellent reactivity with the resin contained in the ink composition.

The polyvalent metal salt is composed of a polyvalent metal ion which is bivalent or more, and an anion bonded to these polyvalent metal ions, and is a compound soluble in water. Specific examples of polyvalent metal ion include divalent metal ions such as $Ca^{2+}$, $Cu^{2+}$, $Ni^{2+}$, $Mg^{2+}$, $Zn^{2+}$, $Ba^{2+}$ and the like; and trivalent metal ions such as $Al^{3+}$, $Fe^{3+}$, $Cr^{3+}$ and the like. Examples of the anion include $Cl^-$, $I^-$, $Br^-$, $SO_4^{2-}$, $ClO_3^-$, $NO_3^-$, $HCOO^-$, $CH_3COO^-$ and the like. Among these polyvalent metal salts, calcium salt and magnesium salt are preferable from the viewpoints of stability of the reaction liquid and reactivity as the coagulant.

Examples of the organic acid include sulfuric acid, hydrochloric acid, nitric acid, phosphoric acid, polyacrylic acid, acetic acid, glycolic acid, malonic acid, malic acid, maleic acid, ascorbic acid, succinic acid, glutaric acid, fumaric acid, citric acid, tartaric acid, lactic acid, sulfonic acid, orthophosphoric acid, pyrrolidonecarboxylic acid, pyrone carboxylic acid, pyrrole carboxylic acid, furancarboxylic acid, pyridine carboxylic acid, coumaric acid, thiophene carboxylic acid, nicotinic acid, a derivative of these compounds, a salt thereof and the like. The organic acid may be used alone or in combination of two or more.

Examples of the cationic polymer include a cationic urethane resin, a cationic olefin resin, and a cationic amine resin.

As the cationic urethane resin, publicly known ones can be appropriately selected and used. For example, Hydran CP-7010, CP-7020, CP-7030, CP-7040, CP-7050, CP-7060, CP-7610, Superflex 600, 610, 620, 630, 640, 650 (trade names, collectively manufactured by DIC Corporation), urethane emulsion WBR-2120C, WBR-2122C (trade names, collectively manufactured by Taisei Fine Chemical) and the like can be used.

The cationic olefin resin has olefin such as ethylene, propylene or the like in its structural skeleton, and publicly known ones can be appropriately selected and used. Furthermore, the cationic olefin resin may be in an emulsion state in which the cationic olefin resin is dispersed in a solvent containing water, an organic solvent or the like. As the cationic olefin resin, commercially available products can be used, such as Arrow Base CB-1200, CD-1200 (trade names, collectively manufactured by Unitika), and the like.

Examples of the cationic amine resin include a cationic polyamine resin, a polyamide resin, a polyacrylamide resin, a polyallylamine resin, and the like. Each of these resins may be a resin having a polyamine structure, a polyamide structure, a polyacrylamide structure, or a polyallylamine structure in a main polymer backbone. Amine also includes quaternary ammonium. Therefore, the polyamine resin is a resin having lots of amino groups or quaternary ammonium groups in the main polymer backbone.

In the cationic polymer such as those mentioned above, a resin having a structure composed of epihalohydrin such as epichlorohydrin can also be used and is preferred.

As the cationic polyallylamine resin, known ones can be appropriately selected and used, and examples thereof include polyallylamine hydrochloride, polyallylamine amide sulfate, allylamine hydrochloride diallylamine hydrochloride copolymer, allylamine acetate diallylamine acetic acid salt copolymer, an allylamine acetate salt/diallylamine acetate salt copolymer, an allylamine hydrochloride/dimethylallylamine hydrochloride copolymer, an allylamine/dimethylallylamine copolymer, a polydiallylamine hydrochloride, a polymethyldiallylamine hydrochloride, a polymethyldiallylamine amide sulfate, polymethyldiallylamine acetate, polydiallyldimethylammonium chloride, diallylamine acetate-sulfur dioxide copolymer, diallylmethylethylammonium ethyl sulfate-sulfur dioxide copolymer, methyldiallylamine hydrochloride-sulfur dioxide copolymer, diallyldimethyl ammonium chloride-sulfur dioxide copolymer, diallyldimethyl ammonium chloride-acrylamide copolymer, and the like. Commercially available products of the cationic allylamine resin can be used, and examples thereof include PAA-HCL-01, PAA-HCL-03, PAA-HCL-05, PAA-HCL-3L, PAA-HCL-10L, PAA-H-HCL, PAA-SA, PAA-01, PAA-03, PAA-05, PAA-08, PAA-15, PAA-15C, PAA-25, PAA-H-10C, PAA-D11-HCL, PAA-D41-HCL, PAA-D19-HCL, PAS-21CL, PAS-M-1L, PAS-22SA, PAS-M-1A, PAS-H-1L, PAS-M-1, PAS-H-5L, PAS-H-10L, PAS-92, PAS-92A, PAS-J-81L, PAS-J-81 (trade names, collectively manufactured by Nittobo Medical Company, Ltd.), Haimo Neo-600, Haimorock Q-101, Q-311, Q-501, HighMax SC-505, SC-505 (trade names, collectively manufactured by Haimo), and the like.

Examples of the cationic surfactant include primary, secondary and tertiary amine salt compounds, alkylamine salt, dialkylamine salt, aliphatic amine salt, benzalkonium salt, quaternary ammonium salt, quaternary alkyl ammonium salt, alkyl pyridinium salt, sulfonium salt, phosphonium salt, onium salt, imidazolinium salt and the like. Specific examples of the cationic surfactant include hydrochloride such as laurylamine, yashiamine, rosinamine and the like, acetate, lauryltrimethylammonium chloride, cetyltrimethylammonium chloride, benzyltributylammonium chloride, benzalkonium chloride, dimethylethyl lauryl ammonium chloride Ethyl sulfate, dimethyl ethyl octyl ammonium ethyl sulfate, trimethyl lauryl ammonium hydrochloride, cetyl pyridinium chloride, cetyl pyridinium bromide, dihydroxyethyl lauryl amine, decyl dimethyl benzyl ammonium chloride, dodecyl dimethyl benzyl ammonium chloride, tetradecyl dimethyl ammonium chloride, hexadecyl dimethyl ammonium chloride, octadecyl dimethyl ammonium chloride, and the like.

The content of the coagulant in the reaction liquid may be 0.1 mass % or more and 25 mass % or less, 1 mass % or more and 20 mass % or less, or alternatively, 3 mass % or more and 10 mass % or less, based on the total mass (100 mass %) of the reaction liquid. The concentration of the coagulant may be 0.03 mol/kg or more in 1 kg of the reaction liquid. It also may be 0.1 mol/kg or more and 1.5 mol/kg or less, and may be 0.2 mol/kg or more and 0.9 mol/kg or less in 1 kg of the reaction liquid.

1.3.2. Water

The reaction liquid used in the present embodiment is preferably an aqueous liquid containing water as a main solvent. The water is a component that is evaporated and scattered by drying after adhering the reaction liquid to the recording medium. It is preferable that water be pure water such as ion exchanged water, ultrafiltered water, reverse osmosis water, distilled water, or alternatively, one in which ionic impurities are removed as much as possible, such as ultrapure water. The sterilized water obtained by irradiating with ultraviolet rays or adding hydrogen peroxide is desirably used because mold and bacteria can be prevented from generating in a case where the aggregating liquid is preserved for a long time.

The content of water contained in the reaction liquid can be, for example, 40 mass % or more, preferably 50 mass % or more, more preferably 60 mass % or more, still more preferably 70 mass % or more, based on the total mass (100%) of the reaction liquid.

1.3.3. Organic Solvent

The reaction liquid used in the present embodiment may contain an organic solvent. By containing the organic solvent, wettability of the reaction liquid to the recording medium can be improved. As the organic solvent, the same organic solvents as those exemplified for the aqueous ink jet ink composition described above can be used. The content of the organic solvent is not particularly limited, but it may be, for example, 10 mass % or more and 80 mass % or less, preferably 15 mass % or more and 70 mass % or less, based on the total mass (100 mass %) of the reaction liquid.

The normal boiling point of the organic solvent falls within the range of the preferred range of the normal boiling point of the organic solvent which may be contained in the ink composition described above, independently of the normal boiling point of the organic solvent which may be contained in the ink composition.

Alternatively, the normal boiling point of the organic solvent is preferably 180° C. or higher, more preferably 180 to 300° C., still more preferably 190 to 270° C., particularly preferably 200 to 250° C.

Furthermore, similarly to the aforementioned ink composition, the reaction liquid contains a water-soluble organic solvent having a normal boiling point of 280° C. or higher in an amount of preferably 5 mass % or less, more preferably 3 mass % or less, more preferably 2 mass % or less, still more preferably 1 mass % or less, and further still more preferably 0.5 mass % or less. In this case, since the drying property of the reaction liquid is good, drying of the reaction liquid is carried out quickly, and the stickiness and scratch resistance of the obtained recorded material are excellent.

1.3.4. Surfactant

A surfactant may be added to the reaction liquid used in the present embodiment. By adding the surfactant, the surface tension of the reaction liquid can be lowered and the wettability with the recording medium can be improved. Among the surfactants, for example, an acetylene glycol surfactant, a silicone surfactant, a fluorine surfactant can be preferably used. As specific examples of these surfactants, the same surfactants as those exemplified for the aqueous ink jet ink composition described later can be used. The content of the surfactant is not particularly limited, but it can be 0.1 mass % or more and 5 mass % or less based on the total mass (100 mass %) of the reaction liquid.

1.3.5. Other Components

The aforementioned pH adjusting agent, antiseptic/fungicide, corrosion inhibitor, chelate or the like may be added to the reaction liquid used in the present embodiment as necessary.

1.3.6. Method for Preparing Reaction Liquid

The reaction liquid used in the present embodiment can be prepared by dispersing and mixing the aforementioned respective components by an appropriate method. After thoroughly stirring each of the components described above, filtration is carried out in order to remove coarse particles and foreign matters which cause clogging, whereby a targeted reaction liquid can be obtained.

1.3.7. Physical Properties of Reaction Liquid

When the reaction liquid used in the present embodiment is ejected by an ink jet head, the surface tension at 20° C. of the reaction liquid is preferably 18 mN/m or more and 40 mN/m or less, more preferably 20 mN/m or more and 35 mN/m or less, still more preferably 22 mN/m or more and 33 mN/m or less. For the measurement of the surface tension, for example, the surface tension when a platinum plate is wetted with the reaction liquid under an environment of 20° C. is confirmed using an automatic surface tensiometer CBVP-Z (trade name, manufactured by Kyowa Interface Science).

From the same viewpoint, the viscosity at 20° C. of the reaction liquid according to the present embodiment is preferably 3 mPa·s or more and 10 mPa·s or less, more preferably 3 mPa·s or more and 8 mPa·s or less. The viscosity can be measured using, for example, a viscoelasticity tester MCR-300 (trade name, manufactured by Pysica) under an environment of 20° C.

1.4. Recording Medium

The ink composition described above has an ink drying property and can obtain an image excellent in image quality and scratch resistance in recording on an ink absorbing, ink non-absorbing property or low absorbing recording medium. Among these, the aforementioned ink composition can be suitably used for an ink non-absorbing or low-absorbing recording medium by using together with the aforementioned reaction liquid.

Examples of the ink absorbing recording medium include fabrics such as cotton, silk, polyester, polyurethane, nylon and the like, each having high ink absorbability, plain papers such as a high quality paper, a recycled paper and the like, a copy paper, an ink jet-dedicated paper provided with an ink receiving layer having ink absorbing capacity, and the like, each having medium ink absorbability.

Examples of the ink non-absorbing recording medium include one which is one coated with a plastic on a substrate such as a plastic film, paper or the like which is not surface-treated for ink jet recording (that is, no ink absorbing layer is formed), one with such a substrate to which a plastic film is bonded, and the like. Examples of plastic referred herein include polyvinyl chloride, polyethylene terephthalate, polycarbonate, polystyrene, polyurethane, polyethylene, polypropylene and the like.

As the low absorbing recording medium, there is a recording medium provided with a coating layer for receiving ink on its surface. For example, in a case where the substrate is paper, a printed paper such as an art paper, a coated paper, a matte paper and the like can be considered. In a case where the substrate is a plastic film, one obtained by coating a hydrophilic polymer, or coating particles of silica, titanium or the like together with a binder, on polyvinyl chloride, polyethylene terephthalate, polycarbonate, polystyrene, Polyurethane, polyethylene, polypropylene or the like, can be considered. These recording media may be a transparent recording medium.

The "low-absorbing recording medium or non-absorbing recording medium" refers to a "recording medium having a water absorbing amount of 10 mL/m$^2$ or less from contact start to 30 msec$^{1/2}$ in the Bristow method." The Bristow method is the most popular method as a method for measuring the amount of liquid absorption in a short time and is also adopted by Japan Paper and Pulp Technology Association (JAPAN TAPPI). For more details of the test method, refer to the standard No. 51 "Paper and Paperboard's Liquid Absorption Test Method: Bristow Method" of "JAPAN TAPPI 2000 Paper Pulp Test Method."

Furthermore, it can be suitably used for the ink non-absorbing or low absorbing recording media having irregularities on its surface such as embossed media.

2. Recording Method

The recording method according to the present embodiment includes a step of adhering the reaction liquid which reacts with and aggregates components of the ink composition to the recording medium; a step of adhering the first ink composition to the recording medium; and a step of adhering the second ink composition having a reactivity with the reaction liquid lower than that of the first ink composition to the recording medium, in which adhesion of the second ink composition to the recording medium is performed prior to adhesion of the first ink composition to the recording medium. Hereinafter, the recording method according to the present embodiment will be described with reference to an example of recording using the ink jet recording apparatus described above.

2.1. Reaction Liquid Adhering Step

The reaction liquid adhering step is a step of adhering the reaction liquid which reacts with and aggregates components of the ink composition to the recording medium. By adhering the reaction liquid to the recording medium, it is possible to improve scratch resistance and image quality of the obtained printed image.

The reaction liquid adhering step may be carried out before or after adhesion of the ink composition, or alternatively, may be carried out simultaneously with adhesion of the ink composition in order to enhance the reactivity with the second ink composition.

In a case of adhering the reaction liquid before adhesion of the ink composition in the reaction liquid adhering step, for example, as shown in FIG. 2, the reaction liquid adhering step is carried out by filling the ink jet head 3a which is the most upstream side in the transport direction of the recording medium M with the reaction liquid. In this case, the reaction liquid is ejected and adhered to the recording medium before the ink is ejected from the ink jet heads 3b to 3d.

In the arrangement shown in FIG. 3, the reaction liquid is filled in the ink jet head 30a, which is the head on the most upstream side in the transport direction of the recording medium M, and the ink is filled in the ink jet heads 30b to 30d in order from the ink having lower reactivity with the reaction liquid. In this case, the reaction liquid is ejected and adhered to the recording medium before the ink is ejected from the ink jet heads 30b to 30d.

In this way, in a case of using the serial type ink jet head 3 or 30, the reaction liquid is not adhered to a predetermined place of the recording medium in the same scanning of the ink before the ink is adhered. The reaction liquid is adhered in the previous scanning, and then the ink is adhered in the subsequent scanning. However, since it is sufficient that at least a part of the scans is performed in the previous scanning, the reaction liquid and the ink may be adhered by the same scanning. Preferably 30% or more, more preferably 50% or more, still more preferably 70% or more of the number of scans to adhere the reaction liquid or ink to a predetermined place is carried out in the previous scanning.

As shown in FIG. 4, in a case where the reaction liquid is adhered using a line-type ink jet head, if the head 300a for ejecting the reaction liquid is disposed on the upstream side in the transport direction of the recording medium M than the heads 300b to 300d which eject the ink the reaction liquid is adhered before the ink.

In a case of adhering the reaction liquid, it is preferable that the recording medium M be heated by the preheater 8 shown in FIG. 1 before the reaction liquid adhering step, or alternatively, by the IR heater 4 or the platen heater 5 shown in FIG. 1 during the reaction liquid adhering step. By allowing the reaction liquid to adhere to the heated recording medium M, the reaction liquid ejected onto the recording medium M spreads easily on the recording medium M, and the reaction liquid can be uniformly applied. Consequently, the ink adhered in the ink composition adhering step described later reacts sufficiently with the reaction liquid, and excellent image quality can be obtained. Since the reaction liquid is uniformly applied on the recording medium M, the coating amount can be reduced, and reduction in scratch resistance of the obtained image can be prevented.

The surface temperature of the recording medium M upon adhering the reaction liquid is set independently of the temperature within the preferable range of the surface temperature (primary heating temperature) of the recording medium M upon adhering the ink (described later. For example, the surface temperature of the recording medium M when depositing the reaction liquid is preferably 45° C. or less, more preferably 40° C. or less, still more preferably 38° C. or less. The lower limit of the surface temperature of the recording medium M when depositing the reaction liquid is preferably 25° C. or higher, more preferably 30° C. or higher, still more preferably 32° C. or higher. In a case where the surface temperature of the recording medium M upon adhering the reaction liquid falls within the above range, the reaction liquid can be uniformly applied to the recording medium M, and the scratch resistance and the image quality can be improved. In addition, it is possible to suppress the influence of heat on the ink jet head 3.

The reaction liquid may be adhered by being ejected from the ink jet head 3 or by other methods, for example, a method of coating the reaction liquid with a roll coater or the like, a method of ejecting the reaction liquid, or the like.

2.2. Ink Composition Adhering Step

The ink composition adhering step is a step of ejecting and adhering the ink composition from the ink jet head 3. With this step, an image composed of the ink composition is formed on the surface of the recording medium M.

In the present embodiment, "image" indicates a recording pattern formed from a group of dots, including text printing and solid image. Furthermore, the "solid image" means an image pattern in which a dot is recorded in all pixels within a minimum recording unit area defined by a recording resolution, and which should be normally an image that the recording region of the recording medium is covered with ink and thus the surface of the recording medium cannot be seen.

In the present embodiment, the ink composition adhering step includes a step of adhering the first ink composition to the recording medium, and a step of adhering the second ink composition having reactivity with the reaction liquid lower than that of the first ink composition to the recording medium, in which adhesion of the second ink composition to the recording medium is performed prior to adhesion of the first ink composition to the recording medium.

Recording may be carried out using three or more ink compositions, and in that case, it is sufficient that the aforementioned relationship is satisfied among any two of the ink compositions to be used.

Adhesion is carried out in advance means that adhesion is started at first. However, adhesion may occur simultaneously during the deposition process. It is more preferable that adhesion of ink adhered to the recording medium be started after finishing adhesion of the ink to be adhered in advance.

In a case of adhesion is carried out in advance, the adhesion place refers to a case where focusing on a region having a certain area in the recording region of the recording medium. For example, it is a 1×1 mm square region. In a case where the first ink composition and the second ink composition are adhered to, for example, the same region in the same amount, adhesion of the second ink composition can be carried out earlier than adhesion of the first ink composition.

In a case of the multi-pass recording method, when a predetermined nozzle (referred to as nozzle 1) for ejecting the first ink composition and a predetermined nozzle (nozzle 2) for ejecting the second ink composition are at the same position in the head of the carriage in the sub-scanning direction, it is assumed that ink adhesion by the nozzles in one pass is simultaneously carried out. For example, see a case of the most upstream nozzle of N1 and the most upstream nozzle of N3 in FIG. 2. In the multi-pass recording method, the carriage moving speed is comparatively fast, and there is little influence even if there is a slight difference in the time interval of ink adhesion performed by the nozzle 1 and the nozzle 2 in one pass. In a case of the multi-pass recording method, adhesion may precede when there is a time difference not shorter than one pass time. In other words, it is the difference in time between the predetermined path and the path after the next path.

On the other hand, in a case of the line type recording method, when the position of a predetermined nozzle for ejecting the second ink composition is on the upstream side than the position of a predetermined nozzle for ejecting the first ink composition, for example, in the transport direction A of the recording medium in FIG. 4, it is assumed that adhesion of the second ink composition is performed prior to adhesion of the first ink composition between the nozzles in one pass. In a case of the line type recording method, since the scanning speed is relatively slow and all the ink compositions used for recording are adhered in one pass, the influence of the time difference is great.

In a case where the first ink composition is adhered to the recording medium before the second ink composition having low reactivity with the reaction liquid is adhered to the recording medium, the first ink composition having high reactivity consumes the coagulant in the reaction liquid beforehand and the second ink composition having low reactivity to be recorded later cannot react with the reaction liquid. Consequently, the image quality and scratch resistance of the recorded product are deteriorated. The first ink composition previously recorded at a position close to the surface of the recording medium is difficult to form a film due to its high reactivity, and scratch resistance is considered to decrease due to poor adhesion to the recording medium. In the recording method according to the present embodiment, by adhering the second ink composition having low reactivity with the reaction liquid to the recording medium in advance, it is possible to prevent the ink of any of the first ink composition and the second ink composition can react sufficiently with the reaction liquid. The second ink composition at a position close to the surface of the recording medium is easily formed into a film, adhesion to the recording medium is good and peeling hardly occurs, and scratch resistance is excellent. Consequently, it is possible to obtain the recording method capable of obtaining a recorded material excellent in image quality and scratch resistance.

In the ink composition adhering step, when adhering the second ink composition before adhering the first ink composition, for example, as shown in FIG. 2, the ink jet head 3a is filled with the reaction liquid, and then the second ink composition is filled in the ink jet head 3b disposed on the upstream side while the first ink composition is filled in the ink jet head 3c or the ink jet head 3d arranged on the downstream side of the ink jet head 3b. Furthermore, for any one of the ink jet heads 3b to 3d, the second ink composition may be filled on the upstream side of the ink jet head and the first ink composition may be filled on the downstream side of the ink jet head. In either case, in any of the three ink jet heads 3b to 3d, it might as well that there is at least one place where the ink composition having low reactivity is ejected and adhered to the recording medium before the ink composition with high reactivity. It is preferable that the step of adhering the ink composition having the lowest reactivity with the reaction liquid to the recording medium is carried out earliest in the step of adhering the ink composition used for recording. It is most preferable that the ink composition be adhered in order from the ink having lower reactivity with the reaction liquid. In this case, a recorded material excellent in image quality and scratch resistance can be obtained.

It is the same in the arrangement shown in FIG. 3. In any of the three ink jet heads 30b to 30d, it might as well that there is at least one place where the ink composition having low reactivity is ejected and adhered to the recording medium before the ink composition with high reactivity. It is preferable that the step of adhering the ink composition having the lowest reaction with the reaction liquid to the recording medium be carried out earliest in the step of adhering the ink composition used for recording. It is most preferable that the ink composition be adhered in order from the ink having lower reactivity with the reaction liquid. In this case, a recorded material excellent in image quality and scratch resistance can be obtained.

In a case of recording using the serial type ink jet head 3 or 30 shown in FIGS. 2 and 3, the first and second ink compositions are not adhered to a predetermined place of the recording medium in the same scanning. The second ink composition is adhered in the previous scanning, and then the first ink composition is adhered in the subsequent scanning. However, since it is sufficient that at least a part of the scans is performed in the previous scanning, the first and second ink compositions may be adhered by the same scanning. Preferably 30% or more, more preferably 50% or more, still more preferably 70% or more of the number of scans to adhere the ink to a predetermined place is carried out in the previous scanning.

In a case where the single scanning is performed using the line type ink jet head as the ink jet head, having a length equal to or greater than the recording width in the width direction of the recording medium as shown in FIG. 4, in any of the three ink jet heads 300b to 300d, it might as well that there is at least one place where the ink composition having low reactivity is ejected and adhered to the recording medium before the ink composition with high reactivity. It is preferable that the step of adhering the ink composition having the lowest reaction with the reaction liquid to the recording medium be carried out earliest in the step of adhering the ink composition used for recording. It is most preferable that the ink composition be adhered in order from the ink having lower reactivity with the reaction liquid. In this case, a recorded material excellent in image quality and scratch resistance can be obtained.

The maximum adhesion amount of the ink composition per unit area on the recording medium M is preferably 5 mg/inch$^2$ or more, more preferably 7 mg/inch$^2$ or more, still more preferably 10 mg/inch$^2$ or more. The upper limit of the adhesion amount of the ink composition per unit area of the recording medium is not particularly limited, but is preferably 20 mg/inch$^2$ or less, more preferably 15 mg/inch$^2$ or less, particularly preferably 13 mg/inch$^2$ or less. The maximum adhesion amount of the ink composition is the total sum of the adhesion amounts of the first ink composition and the second ink composition.

It is preferable to record in a recording region in which the ratio of the amount of the reaction liquid adhered to the total adhesion amount of the ink composition including the first ink composition and the second ink composition per unit area is 5 mass % or more and 20 mass % or less, more preferable in a recording region in which the ratio of the adhesion amount is 7 mass % or more and 18 mass % or less, still more preferable in a recording region in which the ratio of the adhesion amount is 10 mass % or more and 15 mass % or less. In a case where the ratio of the adhesion amount falls within in the above range, a recorded material excellent in image quality and scratch resistance can be obtained.

The ink composition adhering step may include a heating step of heating the recording medium M with the IR heater 4 or the platen heater 5 before the ink composition adhering step or simultaneously with the ink composition adhering step. It is preferably that the ink composition adhering step be performed on the recording medium M which has been heated by the heating means. Consequently, the ink can be quickly dried on the recording medium M, and blurring is suppressed. It is possible to form an image excellent in scratch resistance, sticking resistance and image quality, and by using the above ink, an ink jet recording method excellent in ejection stability can be provided.

The upper limit of the surface temperature (primary heating temperature) of the recording medium M upon adhering the ink is preferably 45° C. or less, more preferably 40° C. or less, still more preferably 38° C. or less. In a case where the surface temperature of the recording medium upon adhering the ink falls within the above range, it is possible to suppress the influence of heat on the ink jet head 3 and to prevent clogging of the ink jet head 3 and the nozzle. The lower limit of the surface temperature of the recording medium M at the time of ink jet recording is preferably 25° C. or higher, more preferably 30° C. or higher, still more further preferably 32° C. or higher, particularly 35° C. or higher. In a case where the surface temperature of the recording medium M during ink jet recording is in the above range, the ink can be quickly dried on the recording medium M and fixed in the early phase, blurring is suppressed, and an image excellent in scratch resistance and image quality can be formed.

2.3. Secondary Heating Step

The recording method according to the present embodiment may include a secondary heating step of heating the recording medium M to which the ink composition is adhered by the curing heater 6 shown in FIG. 1 after the ink composition adhering step. Consequently, the fixing resin or the like contained in the ink composition on the recording medium M is melted to form an ink film, and the ink film is strongly fixed (adhered) on the recording medium M to have excellent film forming properties. It is possible to obtain a high quality image excellent in scratch resistance in a short time.

The upper limit of the surface temperature of the recording medium M by the curing heater 6 is preferably 120° C. or less, more preferably 100° C. or less, still more preferably 90° C. or less. The lower limit of the surface temperature of the recording medium M is preferably 60° C. or more, more preferably 70° C. or more, still more preferably 80° C. or more. In a case where the temperature falls within the above range, a high quality image can be obtained in a short time.

A step of cooling the ink composition on the recording medium M by the cooling fan 7 shown in FIG. 1 may be included after the secondary heating step.

2.4. Other Steps

In the ink jet recording method according to the present embodiment, a cleaning step of discharging the ink composition or the reaction liquid may be provided by means other than the pressure generating means for ejecting and recording the ink, that is, other mechanism which is not a mechanism for ejecting ink for recording provided in the ink jet head 3.

As a mechanism for ejecting ink for recording provided in the ink jet head 3, a piezo element or a heater element provided in a pressure chamber 21 to apply pressure to ink can be considered. This cleaning step may be a step of applying pressure from the outside to the ink jet head 3 to discharge the ink composition and the reaction liquid from the nozzle. By providing this step, a situation where the resin may be welded to the inner wall of the ink jet head 3 can be suppressed, and the ejection stability can be further improved.

Other mechanisms described above include a mechanism for applying pressure which, for example, performs suction (negative pressure) or applies positive pressure from the upstream of the ink jet head. These do not correspond to ink discharging (flushing) due to the function of the ink jet head itself. In other words, it is not discharging using the function of ejecting ink from the ink jet head upon recording.

As described above, the recording method according to the present embodiment includes a step of adhering the reaction liquid which reacts with and aggregates components of the ink composition to the recording medium; a step of adhering the first ink composition to the recording medium; and a step of adhering the second ink composition having a reactivity with the reaction liquid lower than that of the first ink composition to the recording medium, in which adhesion of the second ink composition to the recording medium is performed prior to adhesion of the first ink composition to the recording medium, so that both the first ink composition and the second ink composition by adhering the second ink composition having low reactivity with the reaction liquid to the recording medium in advance. Therefore, it is possible to provide the recording method capable of obtaining a recorded material excellent in image quality and scratch resistance.

3. Example

Hereinafter, embodiments of the invention will be described more specifically with reference to examples and comparative examples, but the present embodiment is not limited to these examples.

3.1. Preparation of Ink and Reaction Liquid

First, a pigment and a water-soluble dispersant resin not listed in Table 1 were mixed in water and stirred with a beads mill to prepare a pigment dispersion. When the reaction liquid was mixed with each pigment dispersion liquid, pigment precipitated, so that each pigment reacted with the reaction liquid to be aggregated. The dispersant resin was used in an amount of 0.5 parts by mass based on 1 part by mass of the pigment. Next, the pigment dispersion and the other components were mixed and stirred so as to obtain blending ratios in Tables 1 and 2, thereby obtaining ink and reaction liquid. All the numerical values in the table are indicated by mass %, and water was added so that the total mass of the ink and the reaction liquid was 100 mass %.

TABLE 1

| | | | Ink No. | | | | | |
|---|---|---|---|---|---|---|---|---|
| | | | C1 | M1 | Y1 | Bk1 | Lc1 | Lm1 |
| | Ink Type | Normal Boiling Point of Organic Solvent (° C.) | Cyan | Magenta | Yellow | Black | Light Cyan | Light Magenta |
| Pigment | Cyan Pigment | | 2 | | | | 0.5 | |
| | Magenta Pigment | | | 5 | | | | 1 |
| | Yellow Pigment | | | | 4 | | | |
| | Black Pigment | | | | | 2 | | |
| Organic Solvent | 2-Pyrrolidone | 245 | 15 | 15 | 15 | 15 | 15 | 15 |
| | Propylene Glycol | 188 | 10 | 10 | 10 | 10 | 15 | 15 |
| | 1,2-Hexanediol | 233 | 3 | 3 | 3 | 3 | 3 | 3 |
| | Glycerin | 290 | | | | | | |
| Surfactant | Silicone | | 1 | 1 | 1 | 1 | 1 | 1 |
| Resin Micro particles | Acrylic Resin | | 6 | 7 | 6 | 7 | 5 | 5 |
| Wax | Polyethylene | | 0.3 | 0.3 | 0.3 | 0.3 | 0.3 | 0.3 |
| | Water | | Residual | Residual | Residual | Residual | Residual | Residual |
| | Total Sum | | 100 | 100 | 100 | 100 | 100 | 100 |
| | Reactivity | | B | A | A | B | C | C |

| | | | Ink No. | | | | | |
|---|---|---|---|---|---|---|---|---|
| | | | C2 | Y2 | Lc2 | C3 | Y3 | Lc3 |
| | Ink Type | Normal Boiling Point of Organic Solvent (° C.) | Cyan | Yellow | Light Cyan | Cyan | Yellow | Light Cyan |
| Pigment | Cyan Pigment | | 2 | | 0.5 | 2 | | 0.5 |
| | Magenta Pigment | | | | | | | |
| | Yellow Pigment | | | 4 | | | 4 | |
| | Black Pigment | | | | | | | |
| Organic Solvent | 2-Pyrrolidone | 245 | 15 | 15 | 15 | 15 | 15 | 15 |
| | Propylene Glycol | 188 | 5 | 5 | 10 | 10 | 10 | 15 |
| | 1,2-Hexanediol | 233 | 3 | 3 | 3 | 3 | 3 | 3 |
| | Glycerin | 290 | 5 | 5 | 5 | | | |
| Surfactant | Silicone | | 1 | 1 | 1 | 1 | 1 | 1 |
| Resin Micro particles | Acrylic Resin | | 6 | 6 | 5 | 3 | 3 | 3 |
| Wax | Polyethylene | | 0.3 | 0.3 | 0.3 | 0.3 | 0.3 | 0.3 |
| | Water | | Residual | Residual | Residual | Residual | Residual | Residual |
| | Total Sum | | 100 | 100 | 100 | 100 | 100 | 100 |
| | Reactivity | | B | A | C | B | A | C |

TABLE 2

| | | Reaction Liquid 1 | Reaction Liquid 2 | Reaction Liquid 3 |
|---|---|---|---|---|
| Coagulant | Polyvalent Metal Salt | 7 | | |
| | Cationic Polymer | | 7 | |
| | Organic Acid | | | 7 |
| Organic Solvent | 2-Pyrrolidone | 15 | 15 | 15 |
| | Propylene Glycol | 10 | 10 | 10 |
| Surfactant | Silicone | 1 | 1 | 1 |
| | Water | Residual | Residual | Residual |
| | Total Sum | 100 | 100 | 100 |

Details of the substances described in Tables 1 and 2 are as follows.

Coagulant
  Polyvalent metal salt: magnesium sulfate-heptahydrate
  Cationic Resin: Cathio Master PD-7 (trade name, manufactured by Yokkaichi Synthetic, polyamine)
  Organic acid: malonic acid
Pigment
  Cyan pigment: C.I. Pigment Blue 15:3
  Magenta pigment: C.I. Pigment Red 122
  Yellow pigment: C.I. Pigment Yellow 150
  Black pigment: carbon black
Surfactant
  Surfactant: BYK348 (trade name, manufactured by BYK Japan, silicone)
Resin Microparticles
  Acrylic resin emulsion: Polyol AM-610 (trade name, manufactured by Showa Denko)
Wax
  Polyethylene wax: AQUACER 515 (trade name, manufactured by BYK Japan)

3.2. Evaluation of Ink Reactivity

Regarding the reactivity of the ink, the physical property value of the mixture when mixing the reaction liquid and the ink was confirmed. It was confirmed that the viscosity of the mixture increased when the above ink and the 0.3 M magnesium sulfate aqueous solution (test liquid) were mixed at a mass ratio of 1:1, and it was evaluated that the ink with the higher viscosity increase rate had higher reactivity. Viscosity increase is viscosity increase (magnification) of the ink mixture after mixing with the test liquid, with respect to the initial ink before mixing with the test liquid. The viscosity was measured using a viscoelasticity tester MCR-72 (trade name, manufactured by Pysica) at 25° C. Upon the viscosity measurement, the mixture after mixing was thoroughly stirred, and a sample used for viscosity measurement was collected in a state where components were apparently homogenous.

Evaluation Criteria

A: Viscosity increase is more than 10 times.

B: Viscosity increase is 5 times or more and less than 10 times.

C: Viscosity increase is less than 5 times.

In detail, for any of the prepared inks, the ink evaluated as "A" exhibited about 20 times of viscosity increase, the ink evaluated as "B" about 7 times, and the ink evaluated as "C" about 0.7 times.

3.3. Evaluation of Resin Reactivity

Regarding the above resin, resin water solubility upon a solid content concentration of 1 mass % and viscosity increase when the above ink and the 0.3 M magnesium sulfate aqueous solution (test liquid) were mixed at a mass ratio of 1:1 were confirmed. The confirmation method is the same as described in the previous section "3.2. Evaluation of Ink Reactivity." The resin of the styrene acrylic acid resin emulsion used in Example shows the viscosity increase of 0.7 times, and the reactivity was low.

3.4. Evaluation Test

Next, evaluation test was carried out using the obtained ink and reaction liquid.

3.4.1. Recording Test

A remodeled machine of an ink jet recording apparatus (trade name "SC-S 30650", manufactured by Seiko Epson Corporation) was prepared. The temperature of the platen heater was adjustable. A polyvinyl chloride film for internal and external signs (trade name "IJ180-10", manufactured by 3M Japan) was used as a recording medium.

Apparatus 1

As shown in FIG. 2, a head configuration (headset) was adopted in which four ink jet heads having six nozzle rows were arranged in the direction in which the nozzle rows extend. The first head (ink jet head 3a) was filled with the reaction liquid using one nozzle row. The second to fourth heads (ink jet heads 3b to 3d) are filled with the inks listed in Tables 3 to 5. One type of ink was filled in one nozzle row. Each nozzle row had a nozzle density of 360 dpi and 360 nozzles. For the recording resolution of the recording pattern, the maximum of pixels is 1440×1440 dpi for each reaction liquid and ink. Dots (droplets) were thinned out or arranged in plural in this pixel. Dots were arranged as uniformly as possible for each ink in the recording pattern. The recording pattern was 5×5 cm. The adhesion amount of the reaction liquid was set to the value listed in the table, and the adhesion amount for each ink used for recording was equalized, so that the total sum of the adhesion mounts corresponded to values listed in Tables 3 to 5.

Recording was carried out by alternately performing main scanning by the carriage on which the head was mounted and sub-scanning as the paper feeding on the recording medium set in the recording apparatus. The distance of one sub-scan was set shorter than the length of one head. The surface temperature of the recording medium upon adhering the reaction liquid or ink was set as the primary heating temperature listed in the table. First, the reaction liquid was adhered to the recording portion, and as the recording progressed, the ink was overlapped and adhered. After the primary heating, the surface of the recording medium was subjected to the secondary heating at 80° C. for about 1 minute by using an after-heater located downstream from the platen of the recording medium. The recording portion of the recording medium on which recording was completed was left at room temperature for 1 day and evaluated by the following methods.

Apparatus 2

As shown in FIG. 3, the apparatus 1 was modified to have a head configuration in which the second to fourth heads (ink jet heads 30b to 30d) were shifted by half a length of the head in the sub-scanning direction in the sub-scanning direction, so that time difference occurred in durations of the sub-scanning with a distance corresponding to half a length of the head and adhesion when the main scanning and the sub-scanning were alternately repeated. The other recording conditions were the same as for Apparatus 1.

Apparatus 3

The line type head was configured to have a corresponding to the paper width by arranging the heads in a line in the width direction of the recording medium. Each of the line type heads had six nozzle rows extending in the paper width direction. Each nozzle row has a nozzle density of 1440 dpi. As shown in FIG. 4, four line type heads were arranged in the transport direction A of the recording medium M. Only two line types heads on the upstream side were used for recording. The reaction liquid was filled in one nozzle row on the most upstream side of the first line type head from the upstream and the inks were sequentially filled in the six nozzle rows of the second line head from the upstream side, from the nozzle row on the most upstream side in order of Lc1, Lm1, C1, Bk1, M1 and Y1. A line type recording method was carried out using such a recording apparatus.

TABLE 3

|  |  | Recording Example No. | | | | |
| --- | --- | --- | --- | --- | --- | --- |
|  |  | Example 1 | Example 2 | Example 3 | Example 4 | Example 5 |
| Arrangement of Ink, etc. | First Head | Reaction Liquid 1 | Reaction Liquid 1 | Reaction Liquid 1 | Reaction Liquid 1 | Reaction Liquid 1 |
|  | Second Head | Lc1, Lm1 | Lc1, Lm1 | C1, Bk1 | C1, Bk1 | M1, Y1 |
|  | Third Head | C1, Bk1 | M1, Y1 | Lc1, Lm1 | M1, Y1 | Lc1, Lm1 |
|  | Fourth Head | M1, Y1 | C1, Bk1 | M1, Y1 | Lc1, Lm1 | C1, Bk1 |
| Adhesion Amount of Reaction Liquid (mg/inch$^2$) |  | 2 | 2 | 2 | 2 | 2 |
| Total Adhesion Amount of Ink (mg/inch$^2$) |  | 20 | 20 | 20 | 20 | 20 |
| Primary Heating Temperature (° C.) |  | 35 | 35 | 35 | 35 | 35 |
| Recording Apparatus |  | Apparatus 1 | Apparatus 1 | Apparatus 1 | Apparatus 1 | Apparatus 1 |

TABLE 3-continued

| Evaluation Results | | | | | |
|---|---|---|---|---|---|
| Scratch Resistance | A | A | B | B | C |
| Image Quality | A | B | B | C | B |
| Ink Ejection Stability (Light Cyan) | A | A | A | A | A |
| Ink Ejection Stability (Cyan) | B | B | B | B | B |

|  |  | Recording Example No. | | | | |
|---|---|---|---|---|---|---|
|  |  | Example 6 | Example 7 | Example 8 | Example 9 | Example 10 |
| Arrangement of Ink, etc. | First Head | Reaction Liquid 1 | Reaction Liquid 2 | Reaction Liquid 3 | Reaction Liquid 1 | Reaction Liquid 1 |
|  | Second Head | Lc1, Lm1 | C1, Bk1 | C1, Bk1 | Lc2, Lm1 | Lc3, Lm1 |
|  | Third Head | C1, M1, Y1, Bk1 | Lc1, Lm1 | Lc1, Lm1 | C2, Bk1 | C1, Bk1 |
|  | Fourth Head | — | M1, Y1 | M1, Y1 | M1, Y2 | M1, Y1 |
| Adhesion Amount of Reaction Liquid (mg/inch$^2$) |  | 2 | 2 | 2 | 2 | 2 |
| Total Adhesion Amount of Ink (mg/inch$^2$) |  | 20 | 20 | 20 | 20 | 20 |
| Primary Heating Temperature (° C.) |  | 35 | 35 | 35 | 35 | 35 |
| Recording Apparatus |  | Apparatus 1 | Apparatus 1 | Apparatus 1 | Apparatus 1 | Apparatus 1 |
| Evaluation Results | | | | | | |
| Scratch Resistance |  | A | A | B | B | B |
| Image Quality |  | B | C | C | B | A |
| Ink Ejection Stability (Light Cyan) |  | A | A | A | A | A |
| Ink Ejection Stability (Cyan) |  | B | B | B | A | B |

TABLE 4

|  |  | Recording Example No. | | | | | |
|---|---|---|---|---|---|---|---|
|  |  | Example 11 | Example 12 | Example 13 | Example 14 | Example 15 | Example 16 |
| Arrangement of Ink, etc. | First Head | Reaction Liquid 1 | Reaction Liquid 1 | Reaction Liquid 1 | Reaction Liquid 1 | Reaction Liquid 1 | Reaction Liquid 1 |
|  | Second Head | C3, Bk1 | M1, Y3 | C1, Bk1 | M1, Y1 | C2, Bk1 | C3, Bk1 |
|  | Third Head | M1, Y3 | Lc3, Lm1 | M1, Y1 | Lc1, Lm1 | M1, Y2 | M1, Y3 |
|  | Fourth Head | Lc3, Lm1 | C3, Bk1 | Lc1, Lm1 | C1, Bk1 | Lc2, Lm1 | Lc3, Lm1 |
| Adhesion Amount of Reaction Liquid (mg/inch$^2$) |  | 2 | 2 | 2 | 2 | 2 | 2 |
| Total Adhesion Amount of Ink (mg/inch$^2$) |  | 20 | 20 | 20 | 20 | 20 | 20 |
| Primary Heating Temperature (° C.) |  | 35 | 35 | 40 | 40 | 40 | 40 |
| Recording Apparatus |  | Apparatus 1 | Apparatus 1 | Apparatus 1 | Apparatus 1 | Apparatus 1 | Apparatus 1 |
| Evaluation Results | | | | | | | |
| Scratch Resistance |  | B | C | B | C | C | B |
| Image Quality |  | C | B | B | A | C | B |
| Ink Ejection Stability (Light Cyan) |  | A | A | B | B | A | A |
| Ink Ejection Stability (Cyan) |  | A | A | C | C | A | B |

|  |  | Recording Example No. | | | | |
|---|---|---|---|---|---|---|
|  |  | Example 17 | Example 18 | Example 19 | Example 20 | Example 21 |
| Arrangement of Ink, etc. | First Head | Reaction Liquid 1 | Reaction Liquid 1 | Reaction Liquid 1 | Reaction Liquid 1 | Reaction Liquid 1 |
|  | Second Head | Lc1, Lm1 | Lc1, Lm1 | C1, Bk1 | C1, Bk1 | Lc1, Lm1 |
|  | Third Head | C1, Bk1 | C1, Bk1 | Lc1, Lm1 | Lc1, Lm1 | C3, Bk1 |
|  | Fourth Head | M1, Y1 | M1, Y1 | M1, Y1 | M1, Y1 | M1, Y1 |
| Adhesion Amount of Reaction Liquid (mg/inch$^2$) |  | 2 | 2 | 1 | 4 | 2 |
| Total Adhesion Amount of Ink (mg/inch$^2$) |  | 20 | 20 | 20 | 20 | 20 |
| Primary Heating Temperature (° C.) |  | 35 | 35 | 35 | 35 | 35 |
| Recording Apparatus |  | Apparatus 2 | Apparatus 3 | Apparatus 1 | Apparatus 1 | Apparatus 1 |
| Evaluation Results | | | | | | |
| Scratch Resistance |  | B | A | A | C | A |
| Image Quality |  | B | A | C | A | A |
| Ink Ejection Stability (Light Cyan) |  | A | A | A | A | A |
| Ink Ejection Stability (Cyan) |  | B | B | B | B | A |

TABLE 5

|  |  | Recording Example No. | | | |
| --- | --- | --- | --- | --- | --- |
|  |  | Comparative Example 1 | Comparative Example 2 | Comparative Example 3 | Comparative Example 4 |
| Arrangement of Ink, etc. | First Head | Reaction Liquid 1 | Reaction Liquid 1 | — | Reaction Liquid 1 |
|  | Second Head | M1, Y1 | C1, M1, Y1, Bk1 | C1, Bk1 | C1, M1, Y1, Bk1, Lc1, Lm1 |
|  | Third Head | C1, Bk1 | Lc1, Lm1 | Lc1, Lm1 | — |
|  | Fourth Head | Lc1, Lm1 | — | M1, Y1 | — |
| Adhesion Amount of Reaction Liquid (mg/inch$^2$) | | 2 | 2 | 2 | 2 |
| Total Adhesion Amount of Ink (mg/inch$^2$) | | 20 | 20 | 20 | 20 |
| Primary Heating Temperature (° C.) | | 35 | 35 | 35 | 35 |
| Recording Apparatus | | Apparatus 1 | Apparatus 1 | Apparatus 1 | Apparatus 1 |
|  |  | Evaluation Results | | | |
| Scratch Resistance | | D | D | A | D |
| Image Quality | | C | C | D | C |
| Ink Ejection Stability (Light Cyan) | | A | A | A | A |
| Ink Ejection Stability (Cyan) | | B | B | B | B |

3.4.2. Evaluation of Scratch Resistance

Regarding the obtained recorded material, scratch resistance was evaluated using a scratch resistance/wet rubbing resistance: JSPS rubbing fastness tester AB-301 (trade name, manufactured by Tester Sangyo). In particular, the surface of the recording medium on which the image was recorded was rubbed back and forth 10 times by a rubbing cloth attached with a white cotton cloth (according to JIS L 0803) while applying a load of 500 g. The degree of peeling of the image (coating film) on the surface of the recording medium was visually observed and evaluated according to the following criteria.
Evaluation Criteria
A: No rubbing traces are observed upon rubbing 10 times with a load of 500 g.
B: Peeling occurs within 10% of the evaluation area upon rubbing 10 times with a load of 500 g.
C: Peeling occurs in 10 to 20% of the evaluation area upon rubbing 10 times with a load of 500 g.
D: Peeling occurs in 30% or more of the evaluation area upon rubbing 10 times with a load of 500 g.

3.4.3. Evaluation of Image Quality

The surface of the solid printed portion of the recorded material obtained as described above was visually observed and the image quality was evaluated according to the following criteria.
Evaluation Criteria
A: No shade unevenness in the solid surface, and no ink accumulation in the blank portion are observed.
B: No shade unevenness in the solid surface, and slight ink accumulation in the blank portion are observed.
C: Shade unevenness in the solid surface, and ink accumulation in the blank portion are observed.
D: Big shade unevenness is observed in the solid surface.

3.4.4. Evaluation of Ink Ejection Stability

After 60 minutes of recording test described in the section 3.4.1, the nozzle ejection state of the nozzle row for each of the cyan ink and light cyan ink was checked to confirm the number of ejection failure nozzles. It was evaluated according to the following criteria.

Evaluation Criteria
A: The proportion of ejection failure nozzles falls within 2%.
B: The proportion of ejection failure nozzles is 3 to 4%.
C: The proportion of ejection failure nozzles is 5% or more.

3.5. Evaluation Results

The results of the evaluation test are summarized in the lower parts of Tables 3 to 5.

In any one of Examples, the image quality and scratch resistance of the recorded material were excellent. In contrast, in Comparative Examples, either the image quality of the recorded material or the scratch resistance was inferior.

In detail, the image quality and scratch resistance of the recorded material were particularly excellent by recording in three stages in order from the inks having lower reactivity with the reaction liquid in Example 1.

In Example 2, since the ink with high reactivity was adhered first by the third head and the fourth head, the image quality was inferior to that in Example 1. However, the first head adhered ink of low reactivity between the first head and the second head, thereby obtaining excellent scratch resistance.

In Examples 3 to 5, similarly to Example 2, the image quality and scratch resistance of the recorded material were also excellent because there was at least one place where the ink having low reactivity was adhered first. According to the results of Examples 2 to 5, when the ink adhered by the second head was the ink having the lowest reactivity, there was a tendency for image quality and scratch resistance of the recorded material to be further improved.

Example 6 was different from Examples 1 to 5 in that two ink jet heads were used. In Example 6, since the number of necessary nozzle rows per ink jet head is large, the apparatus tends to become large in the main scanning direction. In this respect, Example 1 is preferable, but Example 6 is more preferable in avoiding an increase in the size of the apparatus in the transport direction of the recording medium.

Comparing Example 3 with Example 7, it was found that the scratch resistance was improved but the image quality was deteriorated in a case where a cationic polymer was used as the coagulant of the reaction liquid. Comparing Example 3 with Example 8, it was found that the image quality was deteriorated in a case where organic acid was used as the coagulant of the reaction liquid.

Comparing Example 1 with Example 9, it was found that the image quality and scratch resistance of the recorded material was improved in a case where glycerin was not contained as a solvent for the ink. Comparing Example 13 with Example 15, it was found that the ejection stability was good and the image quality and scratch resistance decreased in a case were the ink contained glycerin, even when the primary heating temperature was high. Accordingly, a lower primary heating temperature is advantageous in a case of using the recording method with more excellent image quality and scratch resistance by using an ink with a low content of high boiling point solvent. Comparing Example 13 with Example 16, it was found that the ejection stability was good in a case that the resin of the ink was reduced, even when the primary heating temperature was high.

Comparing Example 21 with Example 1, it was found that there was no influence on the scratch resistance in a case where the cyan ink having high reactivity was adhered after the light cyan ink having low reactivity thereby reducing the resin amount of the cyan ink. The ejection stability was improved in a case that the resin amount of the cyan ink was reduced. Meanwhile, comparing Example 10 with Example 1, it was found that the scratch resistance was lowered in a case where the resin amount of the light cyan ink having low reactivity, which was adhered in advance, was reduced. Besides, the ejection stability of the light cyan ink was excellent in any of cases. Accordingly, scratch resistance is particularly excellent in a case where the resin amount of the ink which is adhered first and has low reactivity is large. Furthermore, the resin amount of the ink which is adhered afterward and has high reactivity has relatively little influence on scratch resistance. In a case of an ink having a relatively large content of pigment, the smaller the resin amount, the better the ejection stability.

On the other hand, comparison of Example 11 with Example 4 and comparison of Example 12 with Example 5 exhibited that scratch resistance and image quality were hardly influenced.

Comparison of Example 4 with Example 13 and comparison of Example 5 with Example 14 exhibited that the higher primary heating temperature allowed the image to be relatively less influenced by the order of ink adhesion to image quality, but the ejection stability tended to decrease.

Comparing Example 17 with Example 1, it was found that the image quality and scratch resistance slightly decreased in a case where the arrangement of the ink jet heads was different and time difference corresponding to half a length of the head occurred. Comparing Example 1 with Example 18, it was found that results of all evaluations were excellent as in Example 1 in a case of a line type ink jet head.

Comparing Example 3 with Example 19, it was found that the image quality was deteriorated in a case where the amount of the reaction liquid was small. On the other hand, comparing Example 3 with Example 19, it was found that scratch resistance was deteriorated in a case where the amount of the reaction liquid was large.

As described above, in any one of Example, it was possible to provide a recording method using a reaction liquid, which is capable of obtaining a recorded material excellent in image quality and scratch resistance.

The invention is not limited to the above-described embodiment, and various modifications are possible. For example, the invention includes a configuration substantially the same as the configuration described in the embodiment (for example, a configuration having the same function, method, and result, or a configuration having the same object and effect). The invention includes a configuration in which non-essential parts of the configuration described in the embodiment are replaced. The invention includes a configuration that achieves the same operation and effect as the configuration described in the embodiment, or a configuration that can achieve the same object. The invention includes a configuration in which a publicly known technique is added to the configuration described in the embodiment.

The entire disclosure of Japanese Patent Application No. 2017-190321, filed Sep. 29, 2017 is expressly incorporated by reference herein.

What is claimed is:

1. A recording method comprising:
adhering a reaction liquid which reacts with and aggregates components of an ink composition to a recording medium;
adhering a first ink composition to the recording medium; and
adhering a second ink composition having reactivity with the reaction liquid lower than that of the first ink composition to the recording medium,
wherein adhesion of the second ink composition to the recording medium is performed prior to adhesion of the first ink composition to the recording medium,
the first ink composition and the second ink composition are inks of a same color type,
a content of a colorant included in the first ink composition is greater than a content of a colorant included in the second ink composition,
the colorant included in the first ink composition and the colorant included in the second ink composition includes dispersed particles, and
the dispersed particles exhibit the reactivity with the reaction liquid.

2. The recording method according to claim 1, wherein the adhering of the second ink composition to the recording medium is performed first in the adhering of the ink composition used for recording.

3. The recording method according to claim 1, wherein the adhering of the first ink composition to the recording medium and the adhering of the second ink composition to the recording medium are performed by single scanning to the recording medium using an ink jet head having a length equal to or greater than a recording width in a width direction of the recording medium.

4. The recording method according to claim 3, wherein the adhering of the first ink composition to the recording medium and the adhering of the second ink composition to the recording medium are performed by scanning a relative position between the recording medium and the ink jet head several times while ejecting the ink composition from the ink jet head, and by sub-scanning in which the relative position between the recording medium and the ink jet head is changed in a sub-scanning direction intersecting a scanning direction.

5. The recording method according to claim 4, wherein the ink jet head ejecting the second ink composition is provided at an upstream side in a transport direction of the recording medium than the ink jet head that ejects the first ink composition.

6. The recording method according to claim 1, wherein the content of an organic solvent that includes alkylene polyols having a normal boiling point of 280°

C. or higher with respect to a total mass of the ink composition is 1 mass % or less in each of the first ink composition and the second ink composition.

7. The recording method according to claim 1,
wherein a surface temperature of the recording medium upon adhering the second ink composition to the recording medium and a surface temperature of the recording medium upon adhering the first ink composition to the recording medium are each 45° C. or less.

8. The recording method according to claim 1,
wherein a coagulant contained in the reaction liquid includes at least one of a polyvalent metal salt, a cationic polymer, and organic acid.

9. The recording method according to claim 1,
wherein the first ink composition and the second ink composition each include resin microparticles, and the content of the resin microparticles of the second ink composition is greater than that of the first ink composition.

10. The recording method according to claim 9,
wherein a viscosity when the resin microparticles contained in the first ink composition and the resin microparticles contained in the second ink composition are respectively mixed with a 0.3 M aqueous solution of magnesium sulfate increases less than 5 times.

11. The recording method according to claim 9,
wherein the content of the resin microparticles contained in the second ink composition is 4 mass % or more.

12. The recording method according to claim 1,
wherein a recording region in which a ratio of an amount of the reaction liquid adhered to a total deposited amount of the ink composition containing the first ink composition and the second ink composition per unit area is 5 mass % or more and 20 mass % or less is recorded.

13. The recording method according to claim 1,
wherein the colorant included in the first ink composition and the colorant included in the second ink composition are at least one of a surface-treated pigment, a resin-dispersed pigment, and a surfactant-dispersed pigment.

14. The recording method according to claim 1,
wherein a difference between hue angles ∠H° of the respective recorded images recorded on the recording medium using the first and second ink compositions is less than 30°.

15. The recording method according to claim 1,
wherein the first and second ink compositions are one selected from the group consisting of a black ink, a yellow ink, cyan ink, and a magenta ink, and the second ink composition has a feature different from the first ink composition other than the content of the colorant.

16. The recording method according to claim 1,
wherein the content of the colorant contained in the first ink composition and the content of the colorant contained in the second ink composition are each in the range of 0.1 to 15 mass % of the ink composition.

17. The recording method according to claim 1,
wherein the first and second ink composition each include resin microparticles, and the resin microparticles are configured to increase in viscosity less than 1.5 times when mixed with a 0.3 M aqueous solution of magnesium sulfate.

* * * * *